(12) United States Patent
Altendorf et al.

(10) Patent No.: US 8,637,805 B2
(45) Date of Patent: Jan. 28, 2014

(54) OPTICAL ENCODER USING OFF-AXIS IMAGING THROUGH A LENS

(75) Inventors: Eric Herbert Altendorf, Everett, WA (US); Tatsuya Nagahama, Kawasaki (JP); Miyako Mizutani, Kawasaki (JP); Toru Yaku, Kawasaki (JP)

(73) Assignee: Mitutoyo Corporation, Kanagawa-ken (JP)

( * ) Notice: Subject to any disclaimer, the term of this patent is extended or adjusted under 35 U.S.C. 154(b) by 409 days.

(21) Appl. No.: 12/956,992

(22) Filed: Nov. 30, 2010

(65) Prior Publication Data

US 2011/0233391 A1  Sep. 29, 2011

Related U.S. Application Data

(63) Continuation-in-part of application No. 12/955,744, filed on Nov. 29, 2010, now Pat. No. 8,476,577.

(30) Foreign Application Priority Data

Mar. 29, 2010  (JP) ................................. 2010-074847

(51) Int. Cl.
*G01D 5/34* (2006.01)

(52) U.S. Cl.
USPC .............. 250/237 G; 250/231.13; 250/231.17

(58) Field of Classification Search
USPC ............. 250/231.13, 231.14, 231.15, 231.16, 250/231.17, 231.18, 237 G
See application file for complete search history.

(56) References Cited

U.S. PATENT DOCUMENTS

| | | | |
|---|---|---|---|
| 6,273,336 B1 | 8/2001 | Rudeen et al. | |
| 6,457,645 B1 | 10/2002 | Gardner, Jr. | |
| 6,940,891 B2 | 9/2005 | Clary et al. | |
| 7,019,842 B2 | 3/2006 | Holzapfel et al. | |
| 7,071,461 B2 | 7/2006 | Iguchi et al. | |
| 7,417,218 B2 * | 8/2008 | Yamamoto et al. | 250/231.13 |
| 7,795,576 B2 | 9/2010 | Chin et al. | |
| 2003/0209658 A1 | 11/2003 | Iguchi et al. | |

FOREIGN PATENT DOCUMENTS

| | | |
|---|---|---|
| JP | 2003307440 A | 10/2003 |
| JP | 2006284564 A | 10/2006 |

\* cited by examiner

*Primary Examiner* — Tony Ko
(74) *Attorney, Agent, or Firm* — Seed IP Law Group PLLC

(57) ABSTRACT

A miniaturized optical encoder capable of obtaining a sufficient amount of light in the light receiving element is provided. An optical encoder 1 includes a scale 2 having a scale track 2' and a readhead 3 having a light source 31 that emits light to the scale track 2', a scale-side lens 32 that transmits the light emitted from the light source 31 to the scale track 2', and a light receiving element 33 that receives the light reflected by the scale track 2' through the scale-side lens 32. The light source 31 is arranged between the scale-side lens 32 and the light receiving element 33. An optical axis Lsrc of the light source 31 is matched with an optical axis Ls of the scale-side lens 32 in a reading direction of the scale 2 and is separated from an optical axis Ls of the scale-side lens 32 by a predetermined distance D in a direction perpendicular to the reading direction of the scale 2.

23 Claims, 14 Drawing Sheets

OPTICAL ENCODER USING OFF-AXIS IMAGING THROUGH A LENS

CROSS-REFERENCE TO RELATED APPLICATION

The present application is a continuation-in-part application of U.S. patent application Ser. No. 12/955,744, filed Nov. 29, 2010.

BACKGROUND

1. Technical Field

The present invention relates to an optical encoder and, more particularly to a lens design and arrangement suitable for use in a compact "off axis" readhead of an optical encoder wherein a principal illumination ray is offset from the lens axis in a direction perpendicular to the reading direction of the encoder.

2. Description of the Related Art

In the related art, there is known an optical encoder including a scale having latticed or striped scale markings and a readhead. A readhead has a light source that emits light to the scale and a light receiving element that receives the light reflected by the scale, so that the position of the readhead with respect to the scale is measured based on the light received by the light receiving element. Some sample optical encoders are disclosed in Japanese Patent Application Publication Nos. 2003-307440 ("Patent Document 1") and 2006-284564 ("Patent Document 2").

The optical encoder disclosed in Patent Document 1 includes scale markings (a scale) and a reflection type optical reader (a readhead) having a light-emitting diode (a light source), an object lens, and a light receiving unit (a light receiving element). In addition, the reflection type optical reader has a half-mirror arranged between the light-emitting diode and the object lens so that an optical path of the light emitted from the light-emitting diode and directed toward the scale markings through the object lens is separated from an optical path of the light reflected by the scale markings and directed toward the light receiving unit through the object lens.

However, in the optical encoder disclosed in Patent Document 1, as the light receiving unit receives the light through the half-mirror, there may be a problem that a sufficient amount of light cannot be obtained. In addition, if the amount of the light emitted from the light-emitting diode increases in order to obtain a sufficient amount of light, power consumption of the light-emitting diode increases, and further, lifetime of the light-emitting diode decreases.

On the other hand, the photoelectric encoder (optical encoder) disclosed in Patent Document 2 includes a scale, a light source, a lens, and a light receiving element. In the photoelectric encoder, an optical path of the light emitted from the light source and directed toward the scale is separated from an optical path of the light reflected by the scale and directed toward the light receiving element through the lens, and a sufficient amount of light is obtained by the light receiving element by arranging the scale, the lens, and the light receiving element in a Scheimpflug relationship.

BRIEF SUMMARY

However, in the photoelectric encoder disclosed in Patent Document 2, the scale and the light receiving element cannot be arranged in parallel. Therefore, there is a problem in that the photoelectric encoder becomes large in size.

In addition, in the photoelectric encoder disclosed in the fifth embodiment of Patent Document 2, the scale and the light receiving element are arranged in parallel by arranging four lenses between the scale and the light receiving element. However, in this photoelectric encoder, since four lenses are arranged between the scale and the light receiving element, there is a problem in that the photoelectric encoder becomes large in size.

The present invention provides a miniaturized optical encoder capable of obtaining a sufficient amount of light in the light receiving element and a clear and undistorted image of a scale track, in order to provide high resolution measurement.

An optical encoder according to the present invention includes a scale including one or more scale tracks that extend along a reading (i.e., measuring) direction of the scale. The scale track comprises a pattern of markings, and various marking patterns are known in the art. A scale track may include, for example, a pattern of latticed or striped scale markings, or an absolute position code, or the like. The optical encoder may also include a readhead, which has a light source that emits light to the scale track. The readhead includes a light receiving element that is arranged in parallel with the scale and receives the light reflected by the scale track, so that the position of the readhead with respect to the scale is measured based on the light received by the light receiving element, wherein the readhead has a scale-side lens that transmits the light emitted from the light source to the scale track and transmits the light reflected by the scale track as scale track image light to the light receiving element. The light source is arranged at, or defines, a light source plane located between a plane of the scale-side lens and a plane of the light receiving element. The center of the light source is separated from an optical axis of the scale-side lens by an illumination off-axis distance Dsrc in a direction perpendicular to a reading (i.e., measuring) direction of the scale track.

In this configuration, since the optical axis of the light source is separated from the optical axis of the scale-side lens by a predetermined distance in the direction perpendicular to a reading direction of the scale track (hereinafter, referred to as a direction perpendicular to the scale track), the illumination light emitted from the light source is transmitted to the scale track through a first portion of the scale-side lens, and this light is reflected by the scale track as the scale track image light and received by the light receiving element through a second portion of the scale-side lens opposite to the first portion about the lens axis in a direction perpendicular to the scale track. Therefore, according to the present invention, it is possible to separate the optical path of the light emitted from the light source and directed toward the scale track from the optical path of the light reflected by the scale and directed toward the light receiving element, through the scale-side lens, without using a half-mirror. Therefore, it is possible to obtain a sufficient amount of light in the light receiving element.

In addition, the scale and the light receiving element are arranged in parallel, and a single scale-side lens is arranged between the scale and the light receiving element. Since the light source is arranged between the scale-side lens and the light receiving element, it is possible to miniaturize the optical encoder.

In various embodiments of the present invention, the light source, the scale-side lens, the scale, and the light receiving element are configured and arranged to provide an object (scale) side telecentric optical system in a reading direction of the scale track, to thereby increase the focal depth of the readhead. Accordingly, it is possible to increase an allowable interval, or the "gap tolerance," between the scale and the readhead.

In some embodiments of the present invention, it is preferable that the readhead has an aperture that is located at, or defines, an aperture plane between the plane of the scale-side lens and the plane of the light receiving element, for transmitting the light that has been reflected by the scale as the scale track image light and passed through the second portion of the scale-side lens toward the light receiving element. A center of the aperture is separated from an optical axis of the scale-side lens by an aperture off-axis distance Dap1 in a direction perpendicular to the reading direction of the scale track, so as to define a first lens off-axis imaging path for the scale track imaging light that reaches the light receiving element. The aperture and the light source are located on opposite sides of a plane that includes both the optical axis of the scale-side lens and the reading direction.

Here, if the optical encoder according to the present invention is configured in reliance solely on the width or the position of the light source, there is a problem that performance of the optical system of the optical encoder may vary due to influence from positional deviation of the light source.

According to the above described embodiment of the present invention, since the optical encoder has an aperture for transmitting the light that has been reflected by the scale and passed through the second portion of the scale-side lens, it is possible to achieve an object (scale) side telecentric optical system by designing the width or position of the aperture, in addition to by designing the width or position of the light source. Since designing or positioning the aperture is relatively easier than designing or positioning the light source, it becomes easier to suppress variance in the performance of the optical system of the optical encoder.

According to yet another embodiment of the present invention, the optical encoder further includes a light receiving element-side lens located at a second lens plane located between the aperture plane and the plane of the light receiving element. The light receiving element-side lens is arranged to receive the scale track image light transmitted through the second portion of the scale-side lens and the aperture, so as to image the received scale track image light onto the light receiving element. The light receiving element-side lens is configured similarly to the scale-side lens and is oriented such that similarly shaped surfaces of the two lenses face in opposite directions along their respective optical axis direction. Further, the optical axis of the light receiving element-side lens is separated from the center of the aperture, in the opposite direction from the optical axis of the scale-side lens, by an aperture off-axis distance Dap2 in a direction perpendicular to the reading direction of the scale track. Thus, the aperture is positioned to transmit the scale track image light, which has been reflected by the scale track and passed through the second portion of the scale-side lens, toward a first portion of the light receiving element-side lens that has a similar shape as the second portion of the scale-side lens and toward the light receiving element.

In various embodiments, the optical encoder may be referred to as using an "off axis" imaging arrangement, in that a light source and an aperture are separated from the optical axis of the scale-side lens in a direction perpendicular to the reading direction of the scale track such that a central ray of the light is provided to the scale track along an optical path that is "off axis" relative to the optical axis of the scale-side lens, and in particular such that a central ray of the scale track imaging light that has been reflected back from the scale track to provide a scale track image on the light receiving element similarly follows an optical path that is "off axis" relative to the optical axis of the scale-side lens in a direction perpendicular to the reading direction of the scale track (on an opposite side of the optical axis of the lens relative to the light source). Further, in some embodiments, the optical encoder may be referred to as using a "double off axis" imaging arrangement, in that after following the off axis optical path outlined above through the scale-side lens, the path of the central ray of the scale track imaging light is also offset from the optical axis of the light receiving element-side lens along a direction perpendicular to the reading direction of the scale track. The "off axis" design is advantageous in achieving a compact optical encoder and may be approximately a telecentric design in particularly advantageous embodiments, and the "double off axis" design is particularly advantageous in reducing or eliminating optical distortion in the scale track image on the light receiving element and may be approximately a doubly telecentric design in particularly advantageous embodiments.

Specifically, since both of the optical axes of the scale-side lens and the light receiving element-side lens, which are facing opposite directions, are separated by the aperture off-axis distances of Dap1 and Dap2, respectively, on both sides from the optical axis of the aperture (which may be understood to be a central axis of the aperture along a direction normal to the scale track) as outlined above, the light passing through the aperture passes through portions of the lenses which having the same shape but are reversed relative to one another both along and about the optical path. As a result, the "double off axis" optical encoder can be used to reduce or cancel the influence of the individual lens aberrations on the scale track image at the light receiving element (e.g., the lens aberrations, coma, and distortion along the optical path cancel one another), and therefore provide accurate measurement.

In some embodiments, an aperture is located between a first focal plane of the scale-side lens and a second focal plane of the light receiving element-side lens. In some embodiments, a light source plane of the light source is offset along the optical axis direction of the lenses from an aperture plane of the aperture. In particular, the light source is not imaged at the aperture, which facilitates the light reflected by the scale track and passing through the aperture to have substantially uniform intensity.

In various embodiments, the scale-side lens and the light receiving element-side lens each has an aspheric surface configured to further reduce or eliminate optical aberrations in an off-axis imaging arrangement.

In some embodiments, the readhead has two light sources, two scale-side lenses, and two apertures, and within the YZ plane perpendicular to the X reading direction of the scale track the optical axes of each light source, each scale-side lens, and each aperture are axisymmetrical to one another with respect to the Z optical axis direction of the light receiving element-side lens.

In this configuration, the light beams (that is, the scale track image light) reflected by two scale tracks each comprising scale track markings can be received by a single light receiving element or light receiving elements arranged in a most compact space. Therefore, for example, the optical encoder can be configured such that one track of scale track markings is used for detecting a movement amount of the scale and the readhead and another track of scale track markings is used for detecting the origins of the scale and the readhead, and light from both of these two tracks of scale track markings can be received by the single light receiving element. As a result, it is possible to reduce the number or size of components in comparison with the case where the optical encoder is configured to receive the light beams with two light receiving elements.

However, in some cases it may be inconvenient or impractical to receive the light beams from two scale tracks using a single light receiving element. For example, in some cases changes in an operating gap relative to the scale track may cause optical cross-talk or conflicting image displacements between the light beams from the two scale tracks. Therefore, in some embodiments the readhead has two sets of a light source, a scale-side lens, an aperture, a light receiving element-side lens, and a light receiving element (e.g., one set providing incremental encoder signals for fine measurement resolution and the other set providing absolute encoder signals for absolute position determination over the measuring range of the encoder). The two sets are configured substantially the same (e.g., corresponding portions of their optical paths may be approximately parallel to one another in the YZ plane) and are arranged adjacent to each other along the direction perpendicular to the reading direction of the scale tracks. As a result, this embodiment may be more practical to build and/or operate more robustly with respect to gap variations, in some applications.

In one embodiment of the present invention, the light source may include a light-emitting body that emits light and a diffusion plate that is arranged in a later stage of an optical path of the light emitted from the light-emitting body and diffuses the light emitted from the light-emitting body. In this configuration, since the width of the light source can be substituted with the width of the diffusion plate, it is possible to more easily design the optical encoder.

In one embodiment of the present invention, the light source may include a light-emitting body that emits light and a light-emitting body lens arranged in a later stage of an optical path of the light emitted from the light-emitting body, and the scale-side lens and the light-emitting body lens constitute a Kohler illumination. In this configuration, since it is possible to reduce unevenness of the light emitted from the light source and directed toward the scale through the scale-side lens, it is possible to enhance accurate measurement.

DETAILED DESCRIPTION OF THE INVENTION

First Embodiment

Hereinafter, a first embodiment of the present invention will be described with reference to the accompanying drawings.

Figure 1:
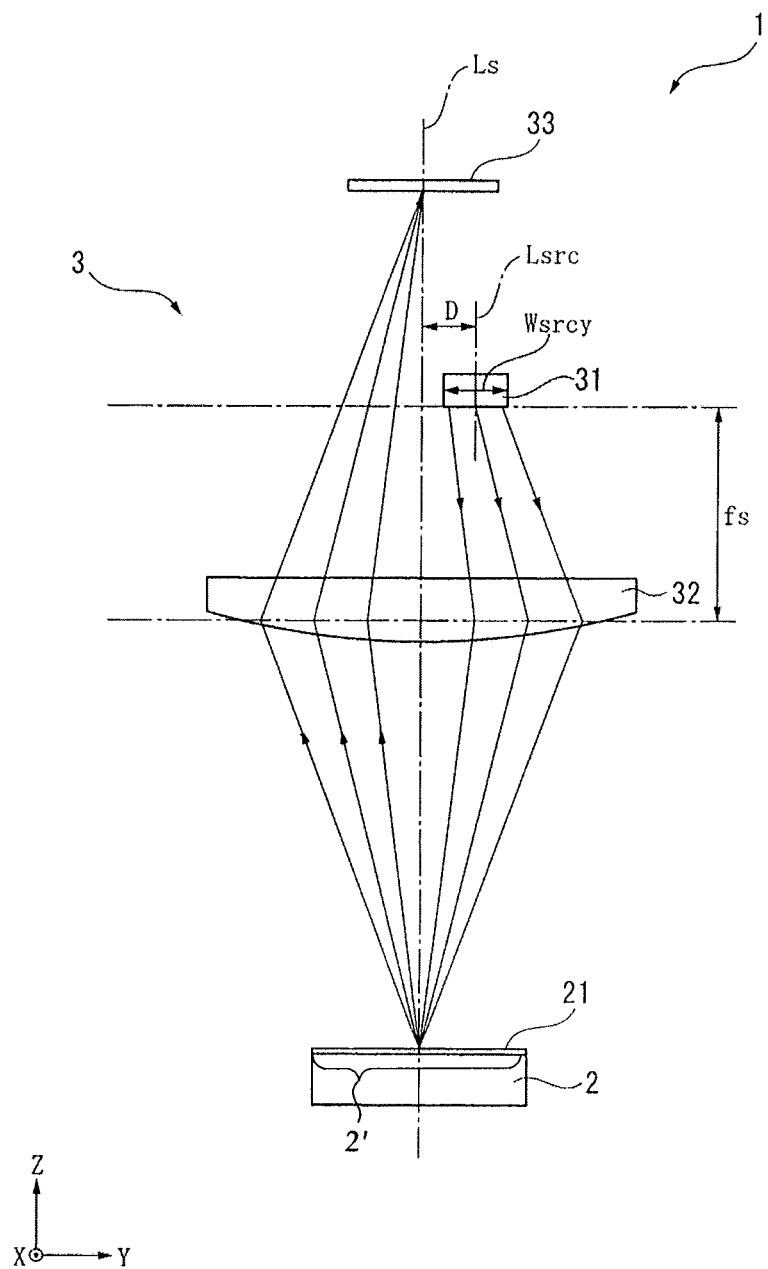
FIG. 1 is a schematic diagram illustrating an optical encoder according to the first embodiment of the present invention as seen along the X reading direction of a scale.

FIG. 1 is a schematic diagram illustrating an optical encoder 1 according to a first embodiment of the present invention. In FIG. 1, the X axis denotes an axis normal to a paper plane and more generally in other figures an axis along a reading or measuring direction of a scale track 2' on a scale 2. The Y axis denotes an axis extending in a horizontal direction and more generally in other figures along a direction perpendicular to the X axis and approximately parallel to a plane of the scale track 2'. A plane defined by (and including) the X and Y axes or any parallel plane thereto (herein referred to as an XY plane) is coincident on or in parallel to a plane including the scale track 2'. The Z axis denotes an axis extending in a vertical direction and more generally in other figures along a direction perpendicular to the XY plane and/or approximately normal to the plane of the scale track 2'. The plane defined by (and including) the X and Z axes or any parallel plane thereto is referred to as an XZ plane, and the plane defined by (and including) the Y and Z axes or any parallel plane thereto is referred to as an YZ plane. As shown in FIG. 1, each scale track 2' may include a plurality of scale markings 21. That is, the scale markings 21 are read by a readhead 3 of an optical encoder along the X axis direction.

Figure 2:
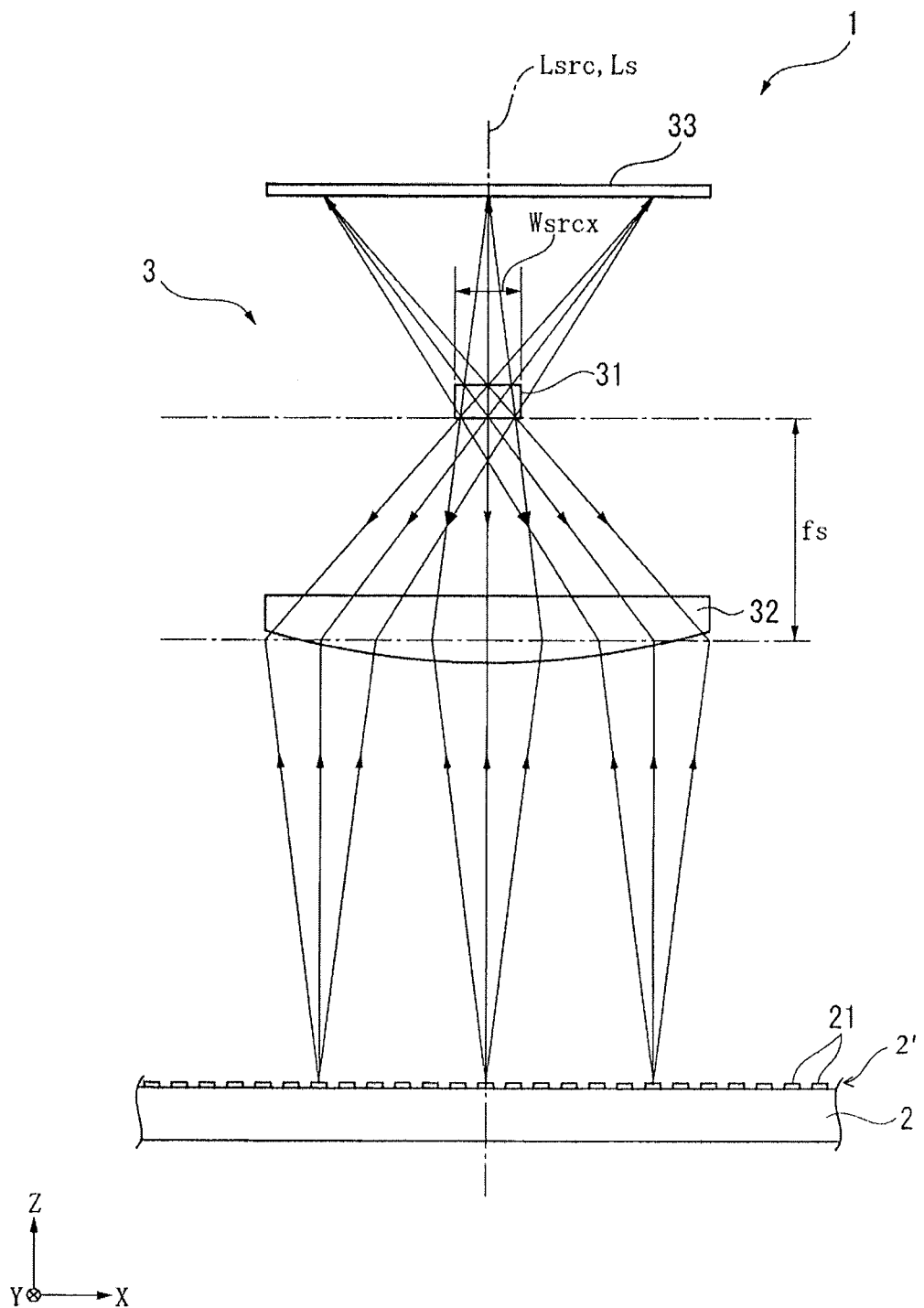
FIG. 2 is a schematic diagram illustrating the optical encoder of FIG. 1 as seen along the Y direction perpendicular to the X reading direction of the scale.

Referring to FIGS. 1 and 2, the optical encoder 1 includes a scale 2 having a scale track 2' including latticed or striped scale markings 21 that can be read along the X-axis direction and a readhead 3 having a light source 31 which emits light to the scale track 2', a scale-side lens 32 which transmits the light from the light source 31 to the scale track 2', and a light receiving element 33 which is arranged in parallel with the scale track 2' and receives the light that has been reflected by the scale track 2' and has passed through the scale-side lens 32 so that the position of the readhead 3 with respect to the scale track 2' is measured based on the light received by the light receiving element 33. That is, the scale-side lens 32 transmits the light reflected by the scale track 2' to the light receiving element 33.

The scale 2 is formed to have a rectangular plate shape, of which the longitudinal direction is aligned along the X-axis direction, and the lateral direction is aligned along the Y-axis direction. FIG. 1 illustrates the optical encoder 1 as seen along the X-axis direction, that is, in a reading direction of the scale track 2'.

FIG. 2 is a schematic diagram illustrating the optical encoder 1 as seen along the Y-axis direction, that is, a direction perpendicular to the reading direction of the scale track 2'. In the present description, the direction (the Y-axis direction) perpendicular to a reading direction of the scale track 2' may be referred to simply as the direction perpendicular to the scale track 2'. As shown in FIGS. 1 and 2, the light source 31 is arranged between the scale-side lens 32 and the light receiving element 33, and the distance between the light source 31 and the scale-side lens 32 is set to be the focal distance fs of the scale-side lens 32.

The optical axis Lsrc of the light source 31 is matched with the optical axis Ls of the scale-side lens 32 in the X reading direction of the scale track 2' (refer to FIG. 2) and is separated from the optical axis Ls of the scale-side lens 32 by a predetermined distance D in the Y direction perpendicular to the scale track 2' (refer to FIG. 1). Here, the predetermined distance D is set to be equal to or larger than ½ of the width Wsrcy (numerical aperture) of the light source 31 in the Y direction perpendicular to the scale track 2'.

Since the optical axis Lsrc of the light source 31 is separated from the optical axis Ls of the scale-side lens 32 by a predetermined distance D in the Y direction perpendicular to the scale track 2', for the light emitted from the light source 31, the light on the light source 31 side in the Y direction perpendicular to the scale track 2' is transmitted to the scale track 2' through the light source 31 side of the scale-side lens 32 in the Y direction perpendicular to the scale track 2' as shown in FIG. 1. This light is reflected by the scale track 2' and received by the light receiving element 33 through the opposite side of the scale-side lens 32, opposite to the light source 31 side, in the Y direction perpendicular to the scale track 2'.

In FIGS. 1 and 2, the optical path of the light received by the light receiving element 33 is denoted by the solid line, and other optical paths of the light are omitted. In the following drawings, similar denotation will be used.

In this aspect, since the distance between the light source 31 and the scale-side lens 32 is set to be the focal distance fs of the scale-side lens 32, the optical encoder 1 can be used to constitute an object (the scale track 2') side telecentric optical system (at least approximately) in a reading direction of the scale track 2' as shown in FIG. 2, so that it is possible to increase the focal depth without altering the magnification of the scale track 2' along the reading direction in the reflected light, which preserves measurement accuracy.

Specifically, the numerical aperture NA of the scale-side lens 32 can be expressed as the following equation (1):

[Equation 1]

$$NA \cong Dp/(Dp-fs) \cdot Wsrcx/2Ds \quad (1)$$

where Wsrcx denotes a width of the light source 31 in a reading direction of the scale track 2', Ds (not shown) denotes a distance from the scale markings 21 of the scale track 2' to the scale-side lens 32, and Dp (not shown) denotes a distance from the scale-side lens 32 to the light receiving element 33.

In addition, the focal depth DOF of the optical encoder 1 can be expressed as the following equation (2):

[Equation 2]

$$DOF = \lambda/2NA^2 = 2\lambda Ds^2/Wsrcx^2 \cdot ((Dp-fs)/Dp)^2 \quad (2)$$

where λ denotes a wavelength of the light emitted from the light source 31.

Therefore, it is possible to increase the focal depth DOF by reducing the width Wsrcx of the light source 31.

In the present embodiment, it is possible to obtain the following effects.

(1) In the optical encoder 1, since it is possible to separate the optical path of the light emitted from the light source 31 and directed toward the scale track 2' and the optical path of the light reflected by the scale track 2' and directed toward the light receiving element 33 through the scale-side lens 32 without a half-mirror, it is possible to obtain a sufficient light amount for the light receiving element 33.

(2) The scale track 2' and the light receiving element 33 are arranged in parallel with each other, and a single scale-side lens 32 is arranged between the scale track 2' and the light receiving element 33. In addition, the light source 31 is arranged between the scale-side lens 32 and the light receiving element 33. Therefore, it is possible to miniaturize the optical encoder 1.

(3) Since the optical encoder 1 can be used to constitute an object (the scale track 2') side telecentric optical system in a reading direction of the scale track 2', it is possible to increase the focal depth. Therefore, it is possible to increase the allowable interval between the scale 2 and the readhead 3.

(4) Since the predetermined distance D between the optical axis Lsrc of the light source 31 and the optical axis Ls of the scale-side lens 32 in the direction perpendicular to the scale track 2' is set to be equal to or larger than ½ of the width Wsrcy of the light source 31 in the direction perpendicular to the scale track 2', it is possible to improve use efficiency of the light emitted from the light source 31. Specifically, if the predetermined distance D is smaller than ½ of the width Wsrcy of the light source 31, a portion of the light source 31 protrudes from the optical axis Ls of the scale-side lens 32 in the direction perpendicular to the scale track 2' so that the light from that portion is not received by the light receiving element 33, thereby degrading use efficiency of the light emitted from the light source 31. On the other hand, setting D equal to or larger than ½ of the width Wsrcy improves use efficiency of the light emitted from the light source 31.

Second Embodiment

Hereinafter, a second embodiment of the present invention will be described with reference to the accompanying drawings. In the following descriptions, like reference numerals denote like elements as in the aforementioned embodiment, and descriptions thereof will not be repeated.

Figure 3:
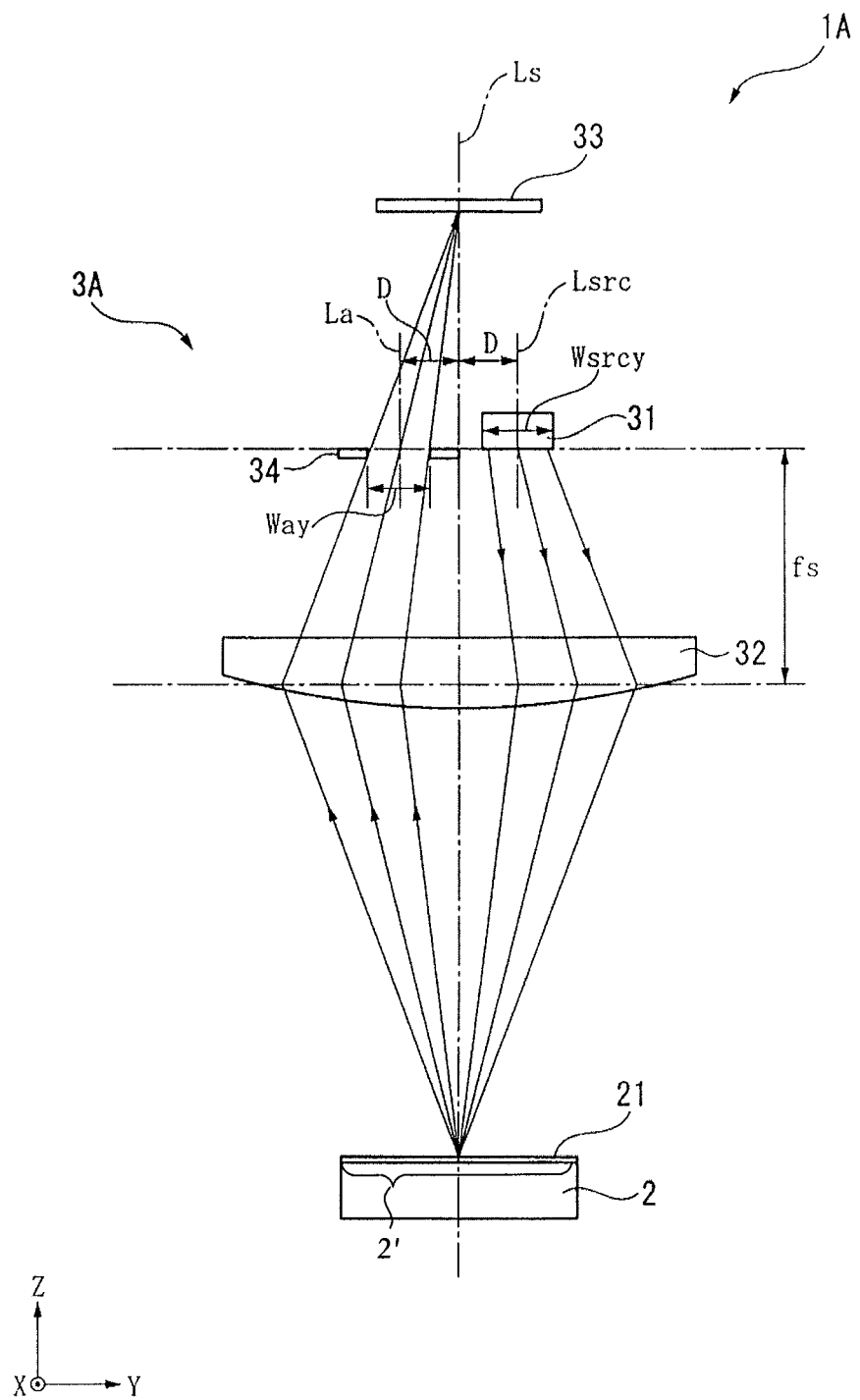
FIG. 3 is a schematic diagram illustrating the optical encoder according to a second embodiment of the present invention as seen along the X reading direction of a scale.
Figure 4:
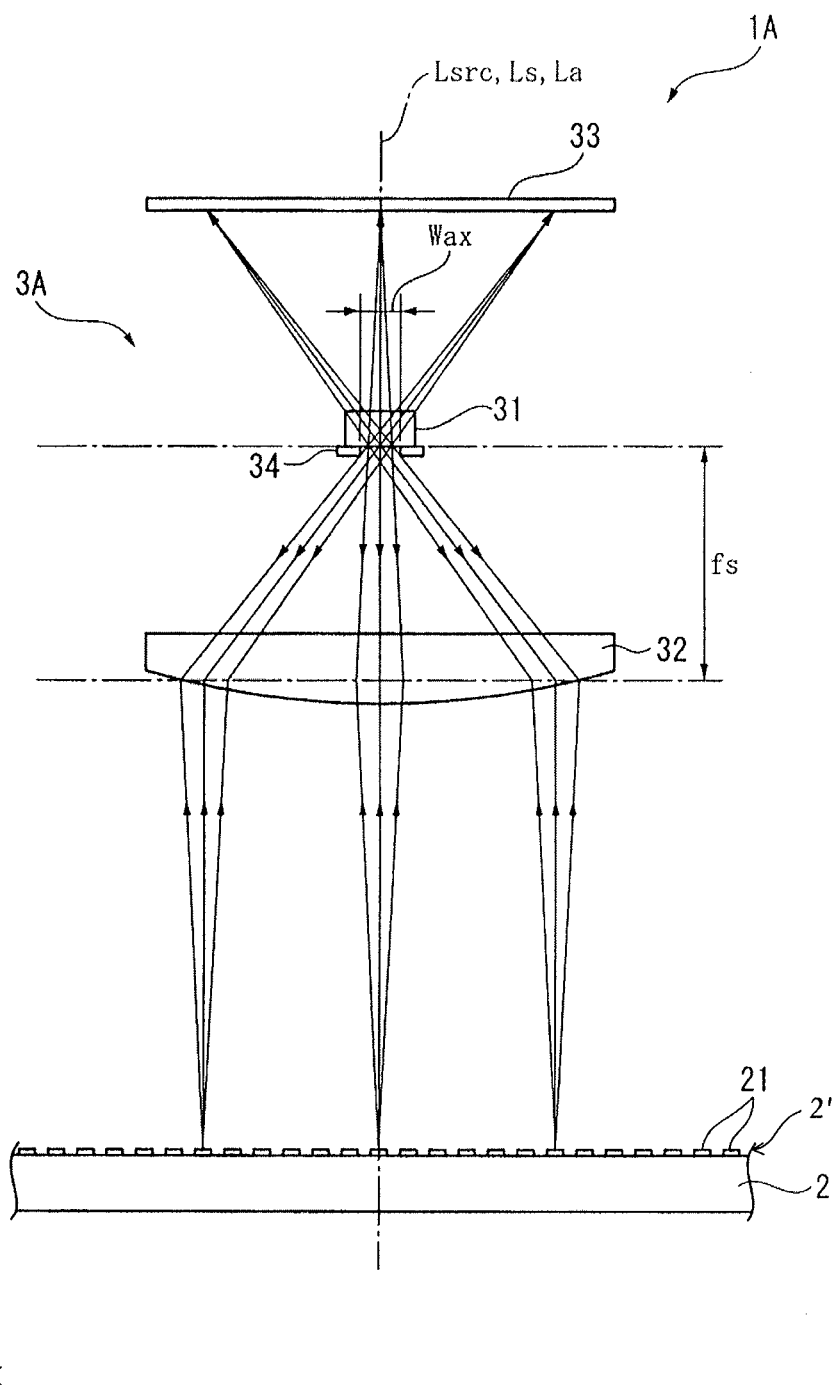
FIG. 4 is a schematic diagram illustrating the optical encoder of FIG. 3 as seen along the Y direction perpendicular to the X reading direction of the scale.

FIG. 3 is a schematic diagram illustrating the optical encoder 1A as seen along a reading direction of the scale track 2' (X direction) according to the second embodiment of the present invention. FIG. 4 is a schematic diagram illustrating the optical encoder 1A as seen along the Y direction perpendicular to the scale track 2'.

In the first embodiment, the optical encoder 1 includes the readhead 3 having the light source 31, the scale-side lens 32, and the light receiving element 33. On the other hand, in the present embodiment, the readhead 3A of the optical encoder 1A further includes an aperture 34 in addition to the light source 31, the scale-side lens 32, and the light receiving element 33 as shown in FIGS. 3 and 4.

The aperture 34 is provided to transmit the light that has been reflected by the scale track 2' and has passed through the scale-side lens 32. The distance between the aperture 34 and the scale-side lens 32 is set to be close to or at the focal distance fs of the scale-side lens 32.

In addition, within the plane (i.e., the paper plane of FIG. 3) perpendicular to a reading direction of the scale track 2', the optical axis La of the aperture 34 and the optical axis Lsrc of the light source 31 are axisymmetrical to each other with respect to the optical axis Ls of the scale-side lens 32. Specifically, while the optical axis La of the aperture 34 is matched with the optical axis Ls of the scale-side lens 32 in the X reading direction of the scale track 2' (refer to FIG. 4), the optical axis La of the aperture 34 is separated from the optical axis Ls of the scale-side lens 32 by a predetermined distance D in the Y direction perpendicular to the scale track 2' (refer to FIG. 3).

Here, the width Way of the aperture 34 in the Y direction perpendicular to the scale track 2' (refer to FIG. 3) is set to be a value as shown in the following equation (3) such that only a positioning error of the light source 31 of δ in the Y direction perpendicular to the scale track 2' is allowable.

[Equation 3]

$$Way \leq Wsrcy - 2\delta \quad (3)$$

In this setting, even when a positioning error of the light source 31 occurs in the Y direction perpendicular to the scale track 2', it is possible to limit the light emitted from the light source 31 using the aperture 34 if the positioning error is equal to or smaller than δ. Therefore, it is possible to suppress variance in the performance of the optical system of the optical encoder 1A due to a position deviation of the light source 31.

Since the distance between the aperture 34 and the scale-side lens 32 is set to be close to or at the focal distance fs of the scale-side lens 32, the optical encoder 1A can be used to constitute an object (the scale track 2') side telecentric optical system in the X reading direction of the scale track 2' as shown in FIG. 4. Therefore, it is possible to increase the focal depth.

Specifically, the numerical aperture NA of the scale-side lens 32 can be expressed as the following equation (4):

[Equation 4]

$$NA \approx Dp/(Dp-fs) \cdot Wax/2Ds \quad (4)$$

where Wax denotes a width of the aperture 34 in the X reading direction of the scale track 2', Ds (not shown) denotes a distance from the scale markings 21 of the scale track 2' to the scale-side lens 32, and Dp (not shown) denotes a distance from the scale-side lens 32 to the light receiving element 33.

In addition, the focal depth DOF of the optical encoder 1A can be expressed as the following equation (5):

[Equation 5]

$$DOF = \lambda/2NA^2 = 2\lambda Ds^2/Wax^2 \cdot ((Dp-fs)/Dp)^2 \quad (5)$$

where λ denotes a wavelength of the light emitted from the light source 31.

Therefore, it is possible to increase the focal depth DOF by reducing the width Wax of the aperture 34.

According to the present embodiment, in addition to the aforementioned functions and effects of the first embodiment, it is possible to obtain the following functions and effects.

(5) Since the optical encoder 1A has the aperture 34 that transmits the light that has been reflected by the scale track 2' and has passed through the scale-side lens 32, it is possible to provide an optical system by designing the width or position of the aperture 34, similarly to providing an optical system by designing the width or position of the light source 31.

(6) Since designing or positioning the aperture 34 is relatively easier than designing or positioning the light source 31, it becomes easier to suppress variance in the performance of the optical system of the optical encoder 1A.

Third Embodiment

Figure 5:
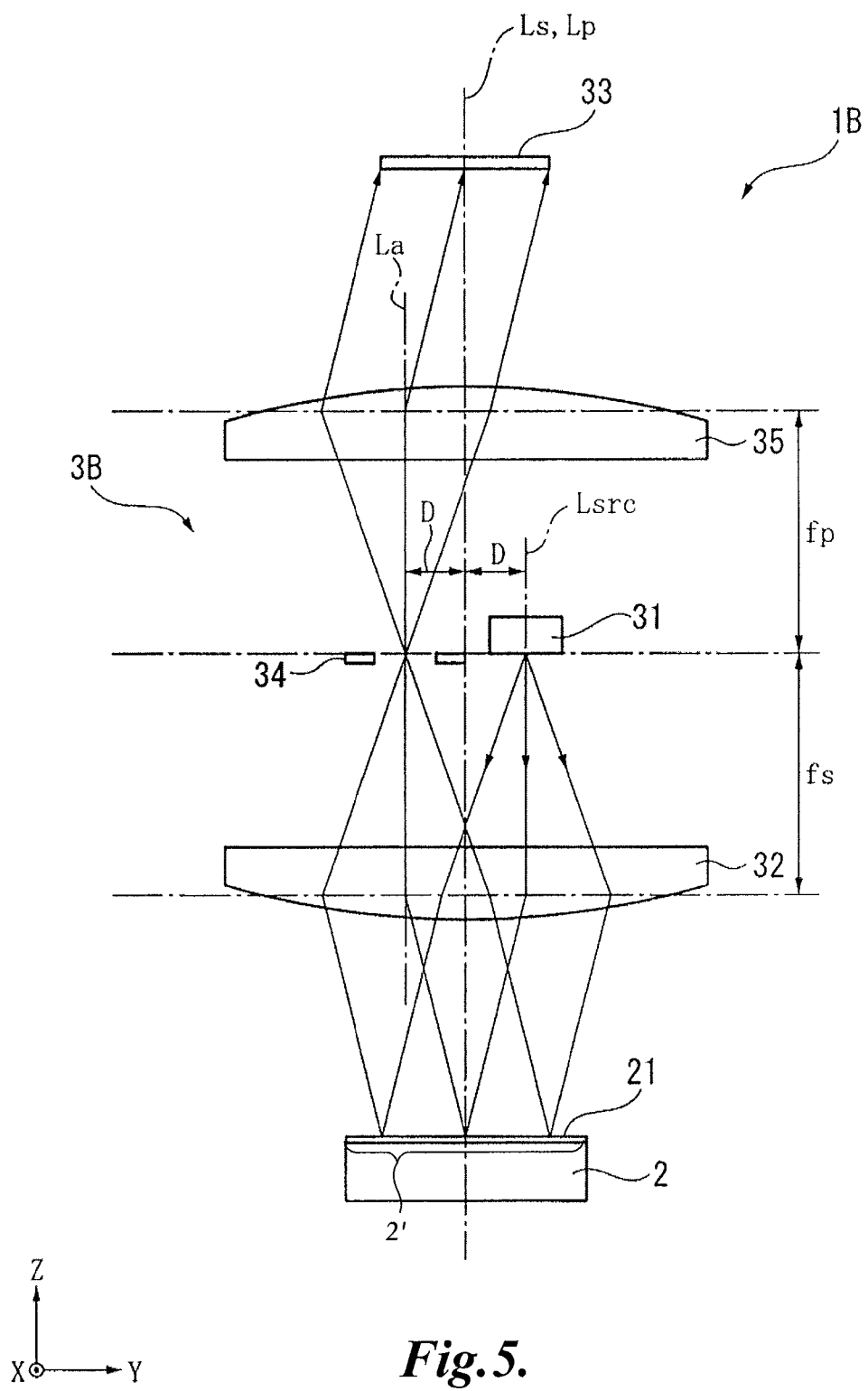
FIG. 5 is a schematic diagram illustrating the optical encoder according to a third embodiment of the present invention as seen along the X reading direction of a scale.
Figure 6:
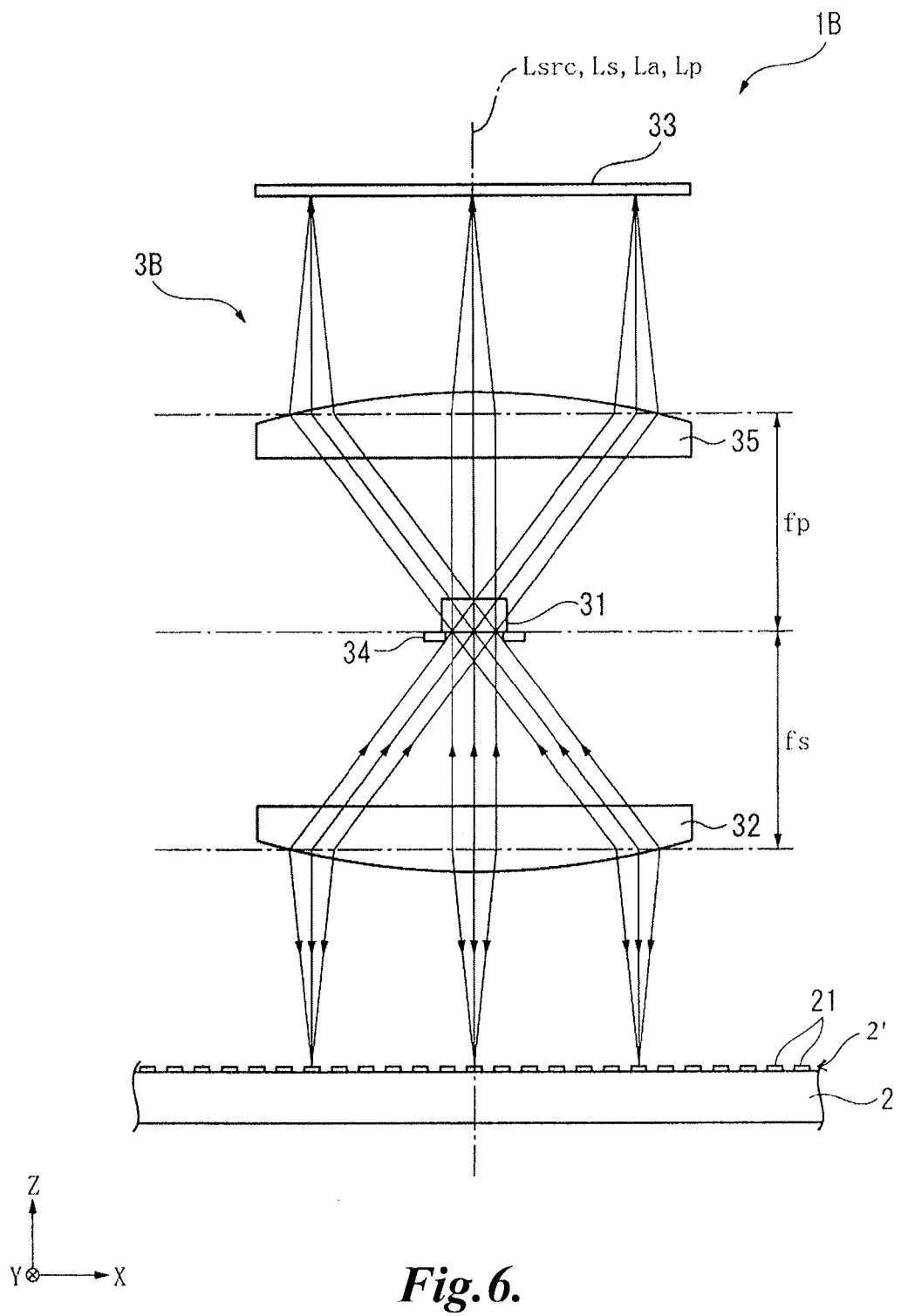
FIG. 6 is a schematic diagram illustrating the optical encoder of FIG. 5 as seen along the Y direction perpendicular to the X reading direction of the scale.

FIG. 5 is a schematic diagram illustrating an optical encoder 1B as seen along the X reading direction of the scale track 2' according to a third embodiment of the present invention. FIG. 6 is a schematic diagram illustrating the optical encoder 1B as seen along the Y direction perpendicular to the scale track 2'.

In the second embodiment, the optical encoder 1A includes the readhead 3A having the light source 31, the scale-side lens 32, the light receiving element 33, and the aperture 34. On the other hand, in the present embodiment, the optical encoder 1B includes the readhead 3B having a light receiving element-side lens 35 in addition to the light source 31, the scale-side lens 32, the light receiving element 33, and the aperture 34 as shown in FIGS. 5 and 6.

The light receiving element-side lens 35 is arranged between the aperture 34 and the light receiving element 33. The distance between the aperture 34 and the light receiving element-side lens 35 is set to be close to or at the focal distance fp of the light receiving element-side lens 35.

In addition, the optical axis Lp of the light receiving element-side lens 35 is matched with the optical axis Ls of the scale-side lens 32.

According to the present embodiment, in addition to the aforementioned functions and effects of the second embodiment, it is possible to obtain the following functions and effects.

(7) Since the optical encoder 1B can be used to constitute a bidirectional telecentric optical system in the X reading direction of the scale track 2', it is possible to increase the focal depth. Accordingly, it is also possible to increase the allowable interval between the light receiving element 33 and the light receiving element-side lens 35.

Fourth Embodiment

Figure 7:
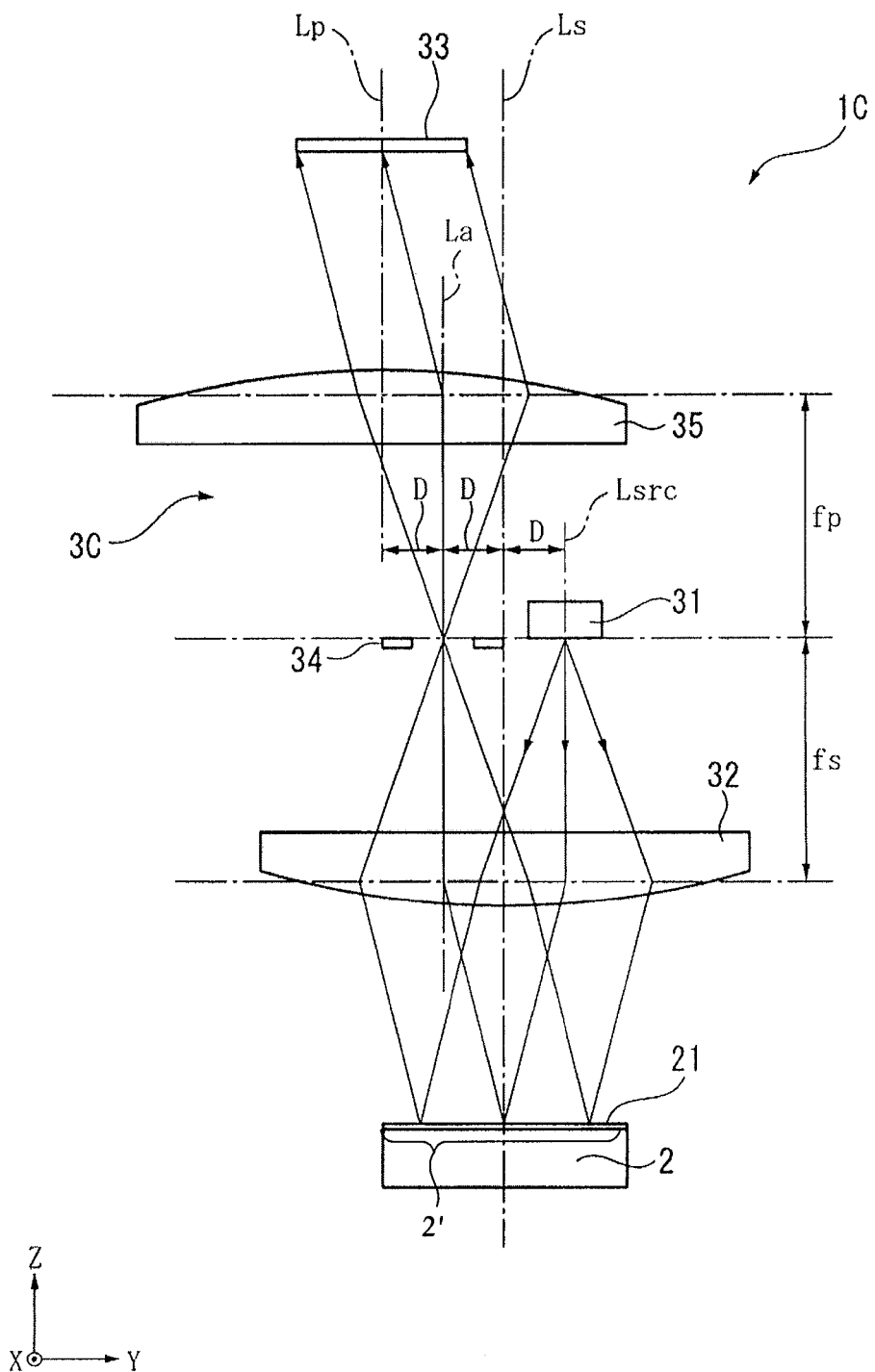
FIG. 7 is a schematic diagram illustrating the optical encoder according to a fourth embodiment of the present invention as seen along the X reading direction of a scale.

FIG. 7 is a schematic diagram illustrating the optical encoder 1C according to a fourth embodiment of the present invention as seen along the X reading direction of the scale track 2'.

In the third embodiment, the optical encoder 1B includes the readhead 3B, and the optical axis Lp of the light receiving element-side lens 35 of the readhead 3B is matched with the optical axis Ls of the scale-side lens 32. On the other hand, according to the present embodiment, as shown in FIG. 7, the optical encoder 1C includes a readhead 3C, and the optical axis Lp of the light receiving element-side lens 35 of the readhead 3C is matched with the optical axis Ls of the scale-side lens 32 in the X reading direction of the scale track 2', while Lp is separated from the optical axis Ls of the scale-side lens 32 by twice the predetermined distance D in the Y direction perpendicular to the scale track 2'.

According to the present embodiment, in addition to the aforementioned functions and effects of the third embodiment, it is possible to obtain the following functions and effects.

(8) In the Y direction perpendicular to the scale track 2', both the optical axes Ls and Lp of the scale-side lens 32 and the light receiving element-side lens 35 are separated from the optical axis La of the aperture 34 by a predetermined distance D on both sides. Therefore, the light passing through the aperture 34 transmits through the portions of the scale-side lens 32 and the light receiving element-side lens 35 having the same shape, in a reversed orientation both along and about their respective optical axes. As a result, the optical encoder 1C can be used to reduce or cancel the influence of lens aberrations in the individual lenses (e.g., the individual lens aberrations may cancel one another) and perform accurate measurement.

Fifth Embodiment

Figure 8:
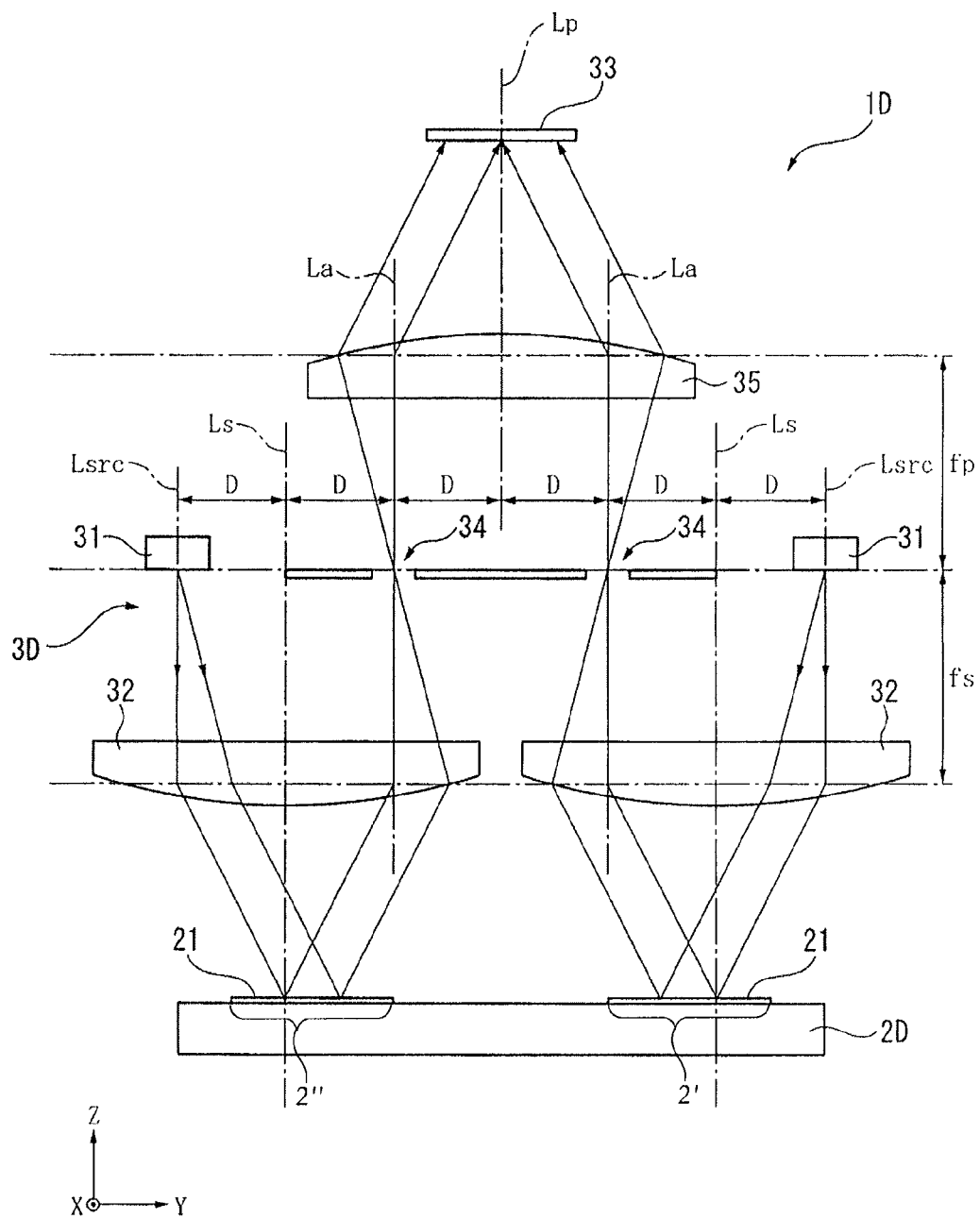
FIG. 8 is a schematic diagram illustrating the optical encoder according to a fifth embodiment of the present invention as seen along the X reading direction of a scale.

FIG. 8 is a schematic diagram illustrating the optical encoder 1D according to a fifth embodiment of the present invention as seen along the X reading direction of the scale track 2'.

In the fourth embodiment of FIG. 7, the optical encoder 1C includes the readhead 3C, and the readhead 3C has a single light source 31, a single scale-side lens 32, and a single aperture 34. On the other hand, according to the present embodiment, as shown in FIG. 8, the optical encoder 1D includes a readhead 3D, and the readhead 3D has two light sources 31, two scale-side lenses 32, and two apertures 34. In addition, two apertures 34 are formed in a single member.

In the fourth embodiment of FIG. 7, the optical encoder 1C includes the scale track 2' having latticed or striped scale markings 21. On the other hand, according to the present embodiment, the scale 2D includes a first scale track 2' and a second scale track 2", each comprising a set of scale markings 21, which may differ between the two scale tracks (e.g., in order to provide a fine resolution incremental scale track and an absolute code scale track).

Furthermore, according to the present invention, within a plane (paper plane of FIG. 8) perpendicular to the X reading direction of the two tracks of scale markings 21, the optical axes Lsrc, Ls, and La of the light sources 31, the scale-side lenses 32, and the apertures 34 are axisymmetrical to one another with respect to the optical axis Lp of the light receiving element-side lens 35.

According to the present embodiment, in addition to the aforementioned functions and effects of the fourth embodiment, it is possible to obtain the following functions and effects.

(9) In the optical encoder 1D, since the light beams reflected by two tracks of scale markings 21 can be received by a single light receiving element 33 or a most compact arrangement of light receiving elements, it is possible to reduce the size and/or number of components in comparison with the case where the optical encoder is configured to receive the light beams using two separated light receiving elements.

Sixth Embodiment

Figure 9:
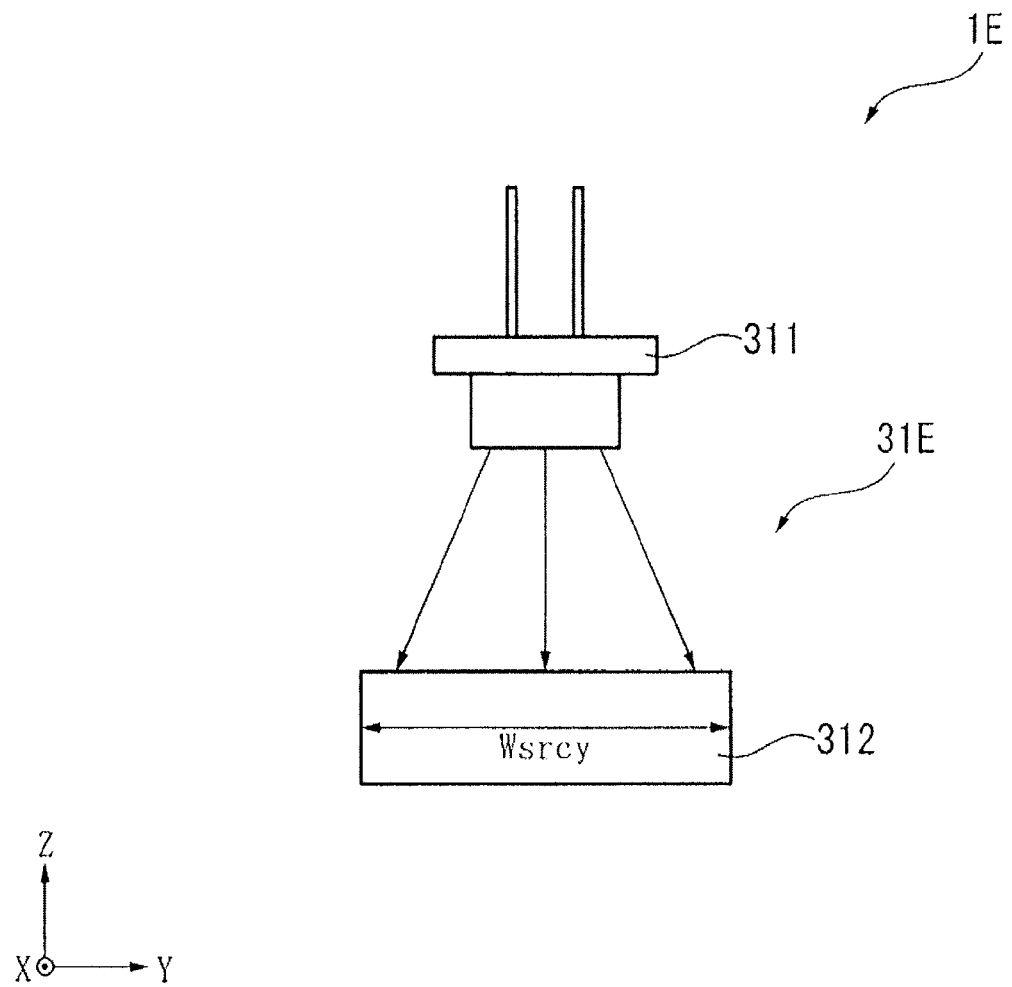
FIG. 9 is a schematic diagram illustrating a light source of the optical encoder according to a sixth embodiment of the present invention.

FIG. 9 is a schematic diagram illustrating the light source 31E of the optical encoder 1E according to a sixth embodiment of the present invention.

In the aforementioned embodiments, each of the optical encoders 1 to 1D includes the light source 31. On the other hand, according to the present embodiment, the optical encoder 1E includes a light source 31E, and the light source 31E includes a light-emitting body 311 that emits light and a diffusion plate 312 that is arranged in a later stage of the optical path of the emitted light from the light-emitting body 311 and diffuses the light emitted from the light-emitting body 311 as shown in FIG. 9.

Although not shown in the drawings, a distance between a plane of the diffusion plate 312 on the scale-side lens 32 side (on the lower side of FIG. 9) and the scale-side lens 32 is set to be the focal distance fs of the scale-side lens 32.

According to the present embodiment, in addition to the aforementioned functions and effects, it is possible to obtain the following functions and effects.

(10) Since the width of the light source 31E can be substituted with the width of the diffusion plate 312, it is possible to easily design the optical encoder 1E.

Seventh Embodiment

Figure 10:
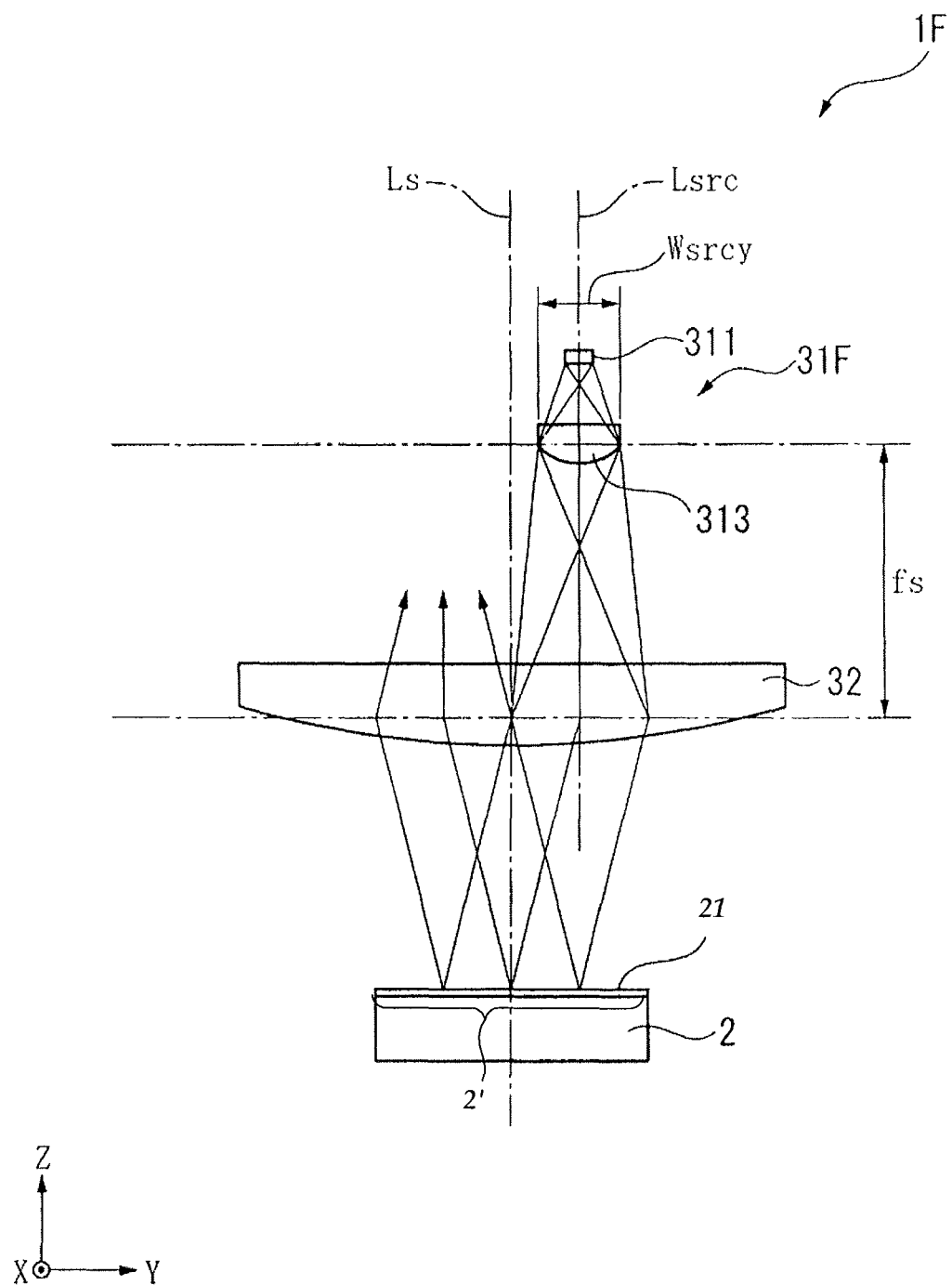
FIG. 10 is a schematic diagram illustrating a light source of the optical encoder according to a seventh embodiment of the present invention.

FIG. 10 is a schematic diagram illustrating a light source 31F of an optical encoder 1F according to a seventh embodiment of the present invention.

In the first to fifth embodiments, the optical encoder 1 to 1D includes the light source 31. On the other hand, according to the present embodiment, the optical encoder 1F includes the light source 31F as shown in FIG. 10, and the light source 31F includes a light-emitting body 311 that emits light and a light-emitting body lens 313 arranged in a later stage of the optical path of the light emitting from the light-emitting body 311 such that the scale-side lens 32 and the light-emitting body lens 313 constitute a Kohler illumination.

According to the present embodiment, in addition to the aforementioned functions and effects, it is possible to obtain the following functions and effects.

(11) Since it is possible to reduce unevenness of the light emitted from the light source 31F and directed toward the scale track 2' through the scale-side lens 32, it is possible to perform accurate measurement.

Modification of the Embodiments

The present invention is not limited to the aforementioned embodiments but may include various modifications and variations within the scope of the invention.

For example, while, in each of the aforementioned embodiments, the predetermined distance D is set to be equal to or larger than ½ of the width Wsrcy of the light source 31, 31E, or 31F in the Y direction perpendicular to the scale track 2', it may be set to other values.

Furthermore, although some aspects of the aforementioned embodiments have been characterized as telecentric, with either a light source or an aperture, or both, located close to or at a focal length from a lens, it will be appreciated that it is unusual to apply such a telecentric characterization to an off axis illumination and/or imaging configuration. In particular, it should be appreciated that off-axis imaging is relatively unconventional, and "ideal" on-axis approximations may work less well than expected in some embodiments. It is most desirable to provide constant magnification and clear imaging along the reading direction of the scale track 2', regardless of reasonable gap variations from the readhead to the scale track 2'. In contrast, as described in greater detail below, reasonable levels of magnification variation and image blur restricted to the Y direction perpendicular to the scale track 2' are not significant because the Y direction is not the measuring direction and the light receiving element may integrate the optical image signals along the Y direction.

In the embodiments outlined below, this fact is utilized to enhance the off axis image telecentricity (e.g., magnification consistency independent of reasonable object or image distance variations) and image clarity specifically along the reading direction of the scale track. In particular, as outlined below, in some embodiments the most advantageous off axis illumination and imaging along the reading direction result when aspheric lens shapes are used, and especially when such lenses are used in combination with locating a light source and/or the aperture at distances other than the focal distance from an aspheric lens in an off axis imaging arrangement that varies somewhat from conventional telecentric arrangements.

Further Embodiments

Figure 11:
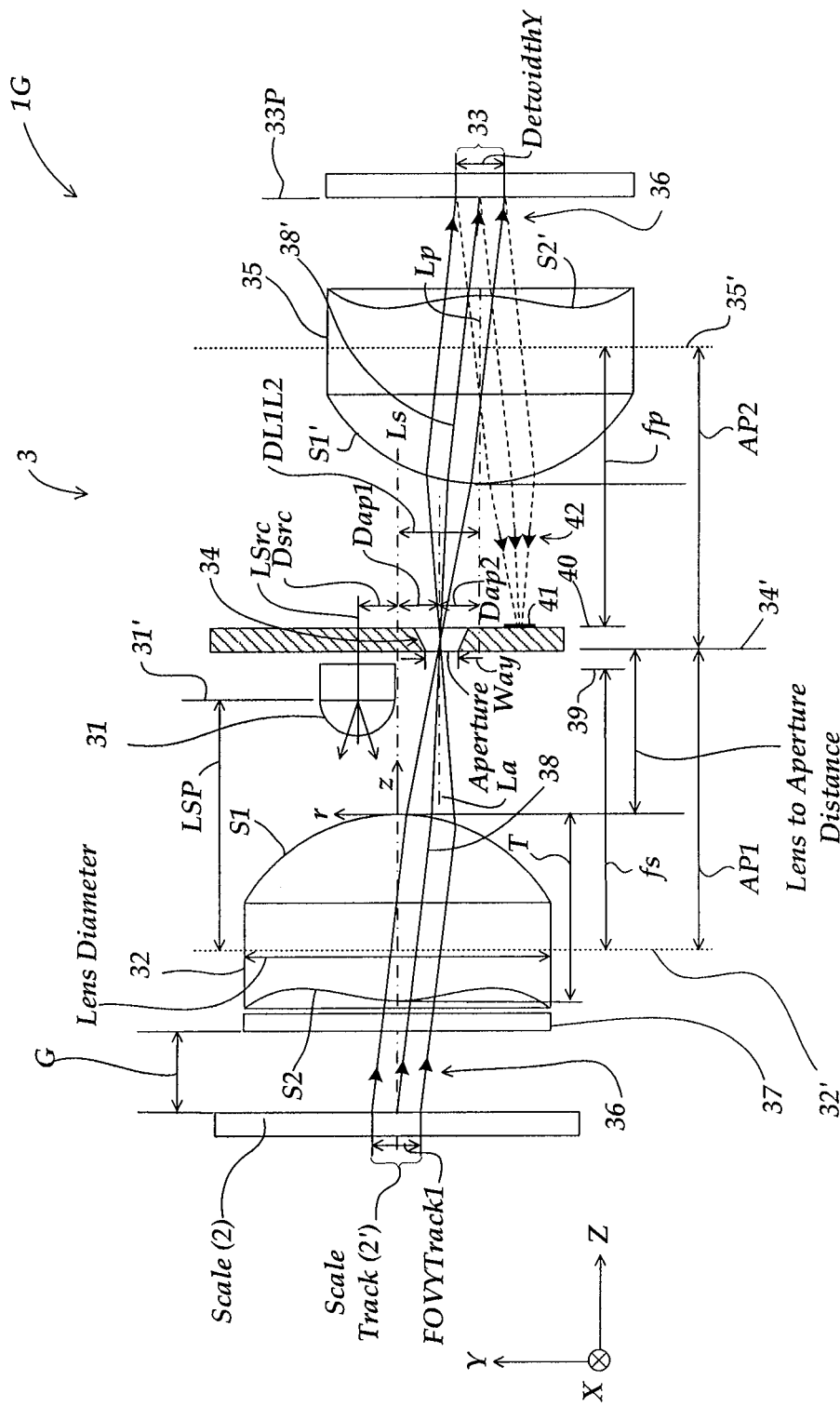
FIG. 11 is a schematic diagram illustrating the optical encoder according to a further embodiment of the present invention as seen along the X reading direction of a scale.
Figure 12:
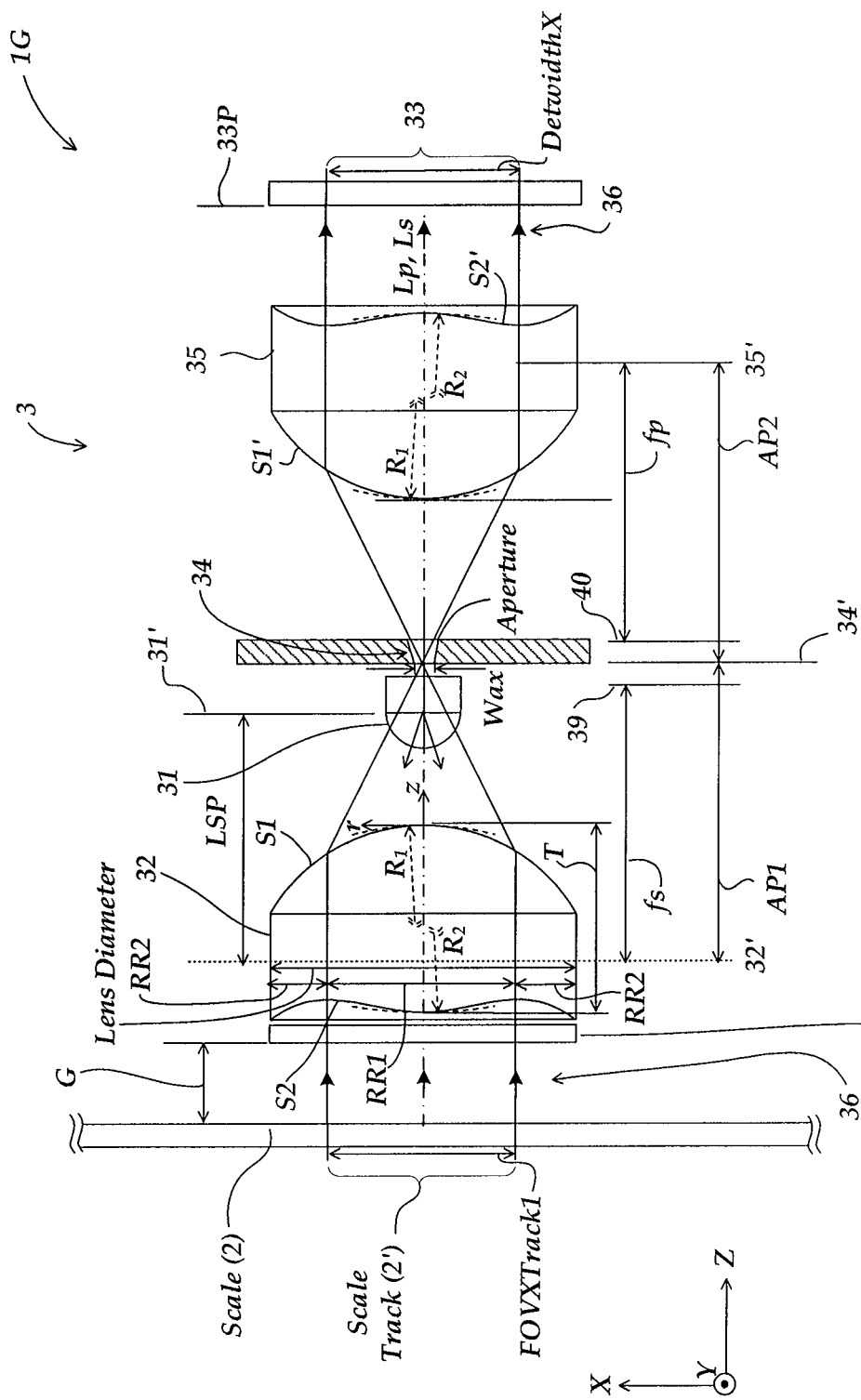
FIG. 12 is a schematic diagram illustrating the optical encoder of FIG. 11 as seen along the Y direction perpendicular to the X reading direction of the scale.
Figure 13:
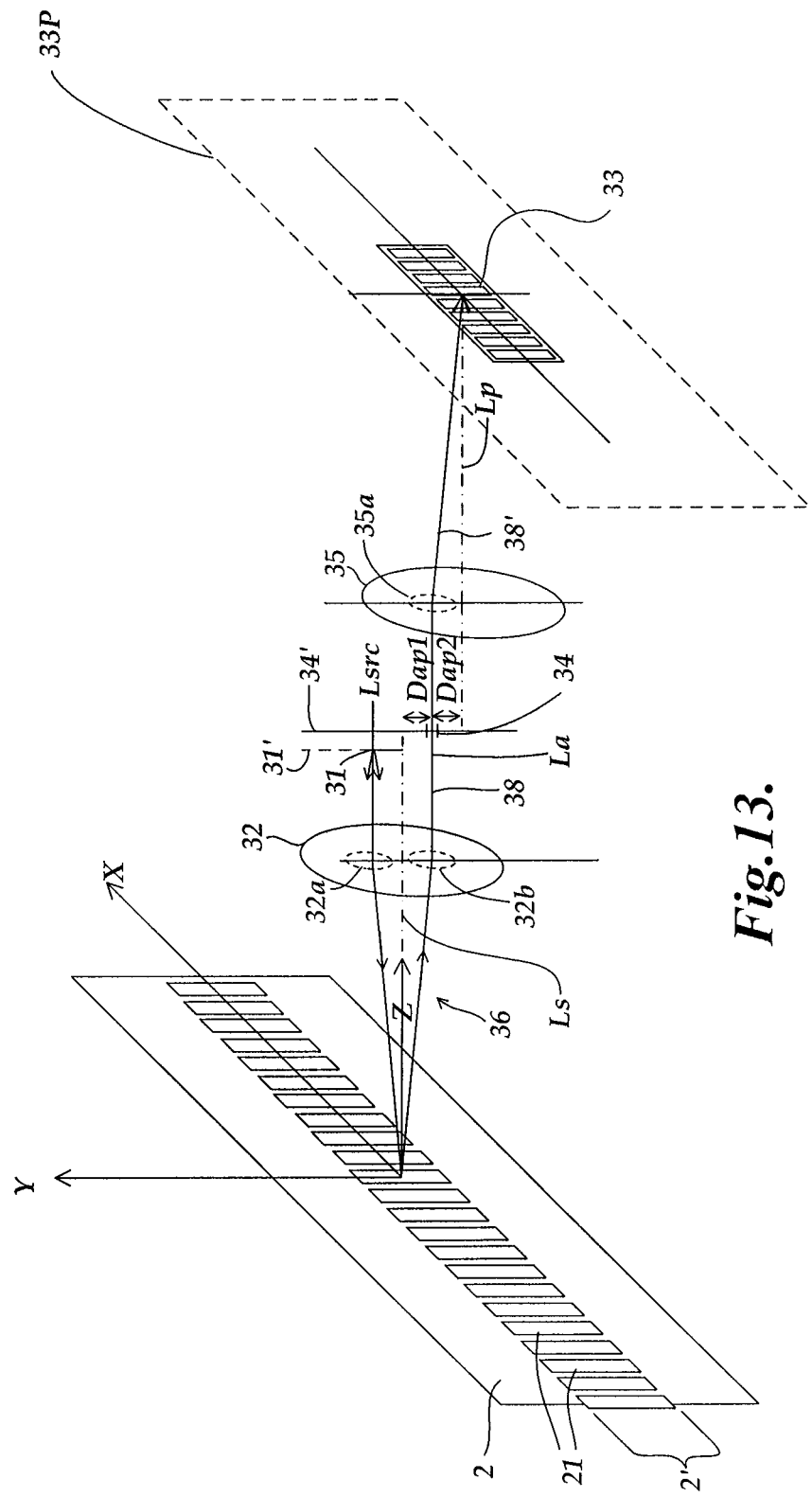
FIG. 13 is a schematic perspective view of the optical encoder of FIG. 11.

FIGS. 11, 12, and 13 illustrate a further embodiment of an optical encoder 1G according to the present invention. FIG. 11 illustrates the optical encoder 1G as seen along the X reading direction of the scale track 2', FIG. 12 illustrates the same optical encoder 1G as seen along the Y direction perpendicular to the scale track 2', and FIG. 13 is a schematic perspective view of the optical encoder 1G.

The optical encoder 1G includes a scale 2 including one or more scale tracks 2', each including a plurality of scale markings 21, and a readhead 3. The scale 2 and the readhead 3 are separated by a scale-to-readhead gap G. The readhead 3 includes a light source 31, a scale-side lens 32, an aperture 34, a light receiving element-side lens 35, and a light receiving element 33. The light source 31 is arranged between a plane 32' of the scale-side lens 32, such as the principal plane of the scale-side lens 32, and a plane 33P of the light receiving element 33, such as the plane of the light receiving element 33 that is closest to the scale 2. The light source 31 may be arranged at, or define, a light source plane 31'. For example, the light source plane 31' may be a plane including a relatively compact light emitting point source of the light source 31. Or, if the light source 31 includes a lens that emits diverging rays from the light source, the light source plane 31' may coincide approximately with the location where those rays are traced back to or converge to their most compact cross section. In operation, generally speaking, the scale-side lens 32 transmits light emitted from the light source 31 through a first off axis portion 32a thereof toward the scale track 2' and transmits the light reflected by the scale track 2' as scale track image light 36 through a second off axis portion 32b thereof. The scale track image light 36 propagates through the second portion 32b of the scale-side lens 32 toward the light receiving element 33. In particular, for the embodiment shown in FIGS. 11-13, the scale-side lens 32 transmits the scale track image light 36 through the aperture 34, and an off axis portion 35a of the light receiving element-side lens 35 to the light receiving element 33, as described in greater detail below.

The effective center of the light source 31 (e.g., as defined by the rays that it emits that actually contribute to the operative scale track image light) may define its optical axis Lsrc, which is separated from the optical axis Ls of the scale-side lens 32 by an illumination off-axis distance Dsrc in a direction (Y) perpendicular to the X reading direction of the scale track 2'.

The aperture 34 is located at, or defines, an aperture plane 34' (e.g., the plane of the aperture 34 closest to the scale 2) positioned between the plane 32' of the scale-side lens 32 and the plane 33P of the light receiving element 33, and more particularly between the plane 32' of the scale-side lens 32 and the plane 35' of the light receiving element-side lens 35 for the embodiment shown in FIGS. 11-13. The center of the aperture 34, which may be defined as its optical axis La, is separated from the optical axis Ls of the scale-side lens 32 by an aperture off-axis distance Dap1 in the Y direction, to define a first lens off-axis imaging path 38 (represented by its central ray in FIG. 11) for the scale track imaging light 36 that reaches the light receiving element 33. In other words, the aperture 34 is arranged to receive the scale track image light 36 through an off axis portion 32b of the scale-side lens 32 (see portion 32b in FIG. 13) that includes the first lens off-axis imaging path 38.

The aperture 34 may be sized and arranged to define the location of the desired first lens off-axis imaging path 38 through the scale-side lens 32 and to select imaging light rays that are collimated or nearly collimated along that path, to thereby ensure a desired level of object (scale) side telecentricity in the X reading direction of the scale track 2'. In other words, the aperture 34 is sized such that it helps constrain the imaging light rays that reach the light receiving element 33 to be substantially parallel to one another ("collimated") on the object side of the scale-side lens 32 and the imaging side of the light receiving element-side lens 35 such that the scale track image formed on the light receiving element 33 exhibits approximately constant magnification regardless of expected variation in the gap G. The size of the aperture 34 may also be selected to determine a numerical aperture for the optical system that provides a desired depth of field for imaging the scale track 2'.

In some embodiments as shown in FIG. 11, a light absorber 41 may be provided at a location that receives light 42 reflected from a portion of the light receiving element 33 where the scale track image is formed based on the scale track image light 36. In the illustrated embodiment, the absorber 41 is provided on a structure that defines the aperture 34, and is configured and formed of material to absorb the light 42 reflected by the light receiving element 33, without re-reflecting the light 42 back toward the light receiving element 33 where the scale track image is formed. Thus, the absorber 41 helps reduce noise that may otherwise arise from the light 42 being re-reflected back toward the light receiving element 33 and, therefore, helps prevent contrast of the scale track image formed on the light receiving element 33 from being decreased.

In the embodiment shown in FIG. 11, the optical axis Lsrc of the light source 31 and the optical axis La of the aperture 34 are approximately or fully axisymmetrically located with respect to the optical axis Ls of the scale-side lens 32. More generally, the aperture 34 and the light source 31 are located on opposite sides of an XZ plane that includes the optical axis Ls of the scale-side lens 32, such that light source light is effectively reflected as scale track image light through the aperture 34. The illumination off-axis distance Dsrc of the light source 31 relative to the scale-side lens axis Ls may be defined according to the aperture off-axis distance Dap1 of the aperture 34 relative to the scale-side lens axis Ls in some embodiments. For example, Dsrc may be defined as greater than 0.8*Dap1 and less than 1.2*Dap1 in order to approximately optimize the amount of scale track imaging light reflected along the first lens off-axis imaging path 38. In some embodiments, it may be advantageous when Dsrc is the same as Dap1 such that the light source 31 and the aperture 34 are located axisymmetrically about the optical axis Ls of the scale-side lens 32, in order to maximize the amount of scale track imaging light reflected along the first lens off-axis imaging path 38.

In some embodiments, the planes of the light source 31 and the aperture 34 may be arranged approximately in a conjugate relationship with each other with respect to operation of the scale-side lens 32. In some embodiments of the invention, the light source 31 is arranged such that the light source plane 31' does not coincide with the aperture plane 34', as shown in FIGS. 11-13. This configuration may be advantageous in preventing the internal structure (e.g., wirebonds) and/or intensity variations in core of the light source 31 from being imaged at the aperture plane 34'. This allows the scale track image light reflected by the scale track 2' and passing through the aperture 34 to have substantially uniform intensity at the aperture 34, which provides more desirable spatial filtering of the scale track image light at the aperture and a more desirable scale track image on the light receiving element 33, which is one of the features important for achieving an accurate measurement by the optical encoder 1G. In the most general case, a light source plane 31' located farther from the scale-side lens 32 than the aperture plane 34' may provide this effect. However, the closer the light source plane 31' is to the scale-side lens 32 (e.g., closer than the aperture plane 34', as shown in FIGS. 11-13), this may be advantageous in that the intensity of the light at the scale track 2' is generally higher. For example, when the light source plane 31' is located at a distance LSP from the plane 32' of the scale-side lens 32, and the aperture plane 34' is located at a distance AP1 from the plane 32' of the scale-side lens 32, LSP may be defined in terms of AP1, and it may be advantageous in some embodiments when LSP is less than 1.2*AP1. In other embodiments, it may be even more advantageous when LSP is less than AP1 to provide higher light intensity. It may further be advantageous when LSP is also greater than 0.7*AP1, which may allow the light source 31 and the aperture 34 to be positioned at distances AP1 and LSP that provide approximately telecentric illumination and/or imaging, which provides previously outlined benefits.

For example, in some embodiments, the distance AP1 (i.e., the location of the aperture plane 34' relative to the plane 32' of the scale-side lens 32) may be defined in terms of a focal length of the scale-side lens 32 in order to provide a desired degree of object side imaging telecentricity. As shown in FIGS. 11 and 12, the scale-side lens 32 has a focal length that defines a first focal plane 39 located at a focal distance fs from the plane 32' of the scale-side lens 32 along the Z direction. It may be advantageous in some embodiments when AP1 is greater than 0.8*fs and less than 1.2*fs. In various embodiments using aspheric lenses and off axis imaging it has been found that it may be even more advantageous when AP1 is greater than fs rather than 0.8*fs (e.g., AP1 may be designed to be at least 1.03*fs, in some specific embodiments).

Similarly, as shown in FIGS. 11 and 12, the light receiving element-side lens 35 has a focal length that defines a second focal plane 40 located at a focal distance fp from the plane 35' of the light receiving element-side lens 35 along the Z direction. The aperture plane 34' is located at a distance AP2 from the plane 35'. It may further be advantageous in some embodiments when the distance AP2 (i.e. the location of the aperture plane 34' relative to the plane 35' of the light receiving element-side lens 35) is defined in terms of the focal length fp in order to provide a desired degree of image side imaging telecentricity. For example, in some embodiments, AP2 is designed to be greater than 0.8*fp and less than 1.2*fp. In various embodiments using aspheric lenses and off axis imaging it has been found that it may be even more advantageous when AP2 is greater than fp rather than 0.8*fp (e.g AP2 may be designed to be at least 1.03*fs, in some specific embodiments). In some embodiments, at least one of the desirable relationships outlined above may be fulfilled, and in addition the aperture plane 34' may be located between the first focal plane 39 and the second focal plane 40 of the two lenses (e.g., to provide symmetrical optical paths on the object side and image side of the aperture 34).

As previously outlined, approximate object (scale) side telecentricity is desirable to make the imaging magnification of the scale markings 21 insensitive to the gap G between the scale track 2' and the scale-side lens 32. Similarly, approximate image side telecentricity is desirable to make the imaging magnification of the scale markings 21 insensitive to the spacing between the light receiving element 33 and the receiving element-side lens 35. However, while it is most desirable to achieve telecentricity in the X reading direction of the scale markings 21, it may not be necessary to achieve telecentricity in the Y direction. In other words, because the imaging light reflected along a single scale marking 21 in the Y direction will be received by (integrated onto) a single detector along the Y direction in the light receiving element 33, the image can be shifted in the Y direction with no impact and it is not necessary to achieve telecentricity or, more generally, reduce or eliminate distortion along the Y direction.

Thus, optical distortion needs to be reduced or eliminated primarily along the X reading direction. Accordingly, as shown in FIGS. 12 and 13, the optical axes of the light source 31, the scale-side lens 32, the aperture 34, and the light receiving element-side lens 35 are aligned at the same plane location along the X reading direction. Stated another way, the second portion 32b of the scale-side lens 32 is symmetrically located relative to the optical axis Ls of the scale-side lens 32 along a direction perpendicular to the Y axis in an XZ plane. This tends to minimize image distortion along the X reading direction, since along this direction, imaging is performed using portions of the lenses which are symmetric relative to a plane including the optical axis of each lens, and lenses generally provide better imaging using symmetrical imaging rays close to their optical axes. On the other hand, the optical axes of the light source 31, the scale-side lens 32, the aperture 34, and the light receiving element-side lens 35 are not aligned at the same location along the Y direction. Stated another way, as shown in FIG. 13, the second portion 32b of the scale-side lens 32, through which the scale track image light 36 reflected by the scale track 2' passes, is not symmetrically located about the optical axis Ls of the scale-side lens 32 along a direction perpendicular to the Z axis in an XY plane. The associated "off axis" and "double off axis" Y direction imaging paths through the scale-side lens 32 and the light receiving element-side lens 35 are not ideal for reducing distortion in the Y direction but are desirable to achieve overall compactness of the optical encoder 1G. Furthermore, the first and/or second portions 32a, 32b of the scale-side lens 32 do not include the optical axis Ls of the scale-side lens 32 so as to reduce or eliminate cross-talk of the illumination light and the imaging light through the first and second portions 32a and 32b, respectively, of the scale-side lens 32.

Since optical distortion needs to be reduced or eliminated primarily along the X reading direction, in some embodiments it is preferred that the aperture width Way along the Y direction is longer than the aperture width Wax along the X direction. In general, a larger aperture is desirable for greater light throughput (which creates a larger signal on the light receiving element 33) but it may also reduce depth of field and/or allow more optical aberration. In various embodiments of the present invention, however, since the optical aberrations along the Y direction need not be minimized, the aperture width Way along the Y direction can be made larger to transmit more light, while the aperture width Wax along the X direction is made smaller to increase the depth of field and telecentricity along the X reading direction to a desirable degree.

The optical encoder 1G may be characterized as an "off axis" configuration in that the light source 31 transmits light through an off axis portion 32a, and/or scale track image light is transmitted through an off axis lens portion 32b which are separated from the optical axis Ls of the scale-side lens 32 along the Y direction (see FIGS. 11 and 13). Further, the optical encoder 1G may be characterized as a "double off axis" configuration in that the scale track image light is transmitted furthermore through an off axis lens portion 35a, which is separated from the optical axis Lp of the light receiving element-side lens 35 along the Y direction. As previously outlined, the "off axis" configuration is advantageous in miniaturizing the size of the optical encoder 1G. The "double off axis" configuration is advantageous in reducing the optical distortion that can otherwise be associated with an isolated "off axis" configuration.

In the particular double off axis configuration shown in FIGS. 11-13, to maximize its advantages, the scale-side lens 32 and the light receiving element-side lens 35 are similarly configured and are oriented such that their similarly shaped surfaces face in opposite directions from each other along their respective optical axes Ls, Lp. For example, in the illustrated embodiment of FIG. 11, both of the lenses 32 and 35 are configured to have a generally convex first aspheric surface S1 (S1') and a second aspheric surface S2 (S2'), and the lenses 32 and 35 are arranged such that their respective generally convex first surfaces S1 (S1')' face each other. Further, the optical axis Lp of the light receiving element-side lens 35 is separated from the optical axis Ls of the scale-side lens 32 in the Y direction by a distance DL1L2 (FIG. 11), such that the scale track image light 36, which has been reflected by the scale track 2' and has passed through the second portion 32b of the scale-side lens 32 and the aperture 34, passes through a first portion 35a of the light receiving element-side lens 35 (FIG. 13) which has a shape approximately or completely similar to the portion 32b, but with the shape effectively rotated by 180 degrees about the direction of the optical axes Ls, Lp. Stated another way, the aperture 34 and the lenses 32 and 35 are arranged such that the aperture defines a second lens off-axis imaging path 38' that passes through a desirable portion 35a of the light receiving element-side lens 35 that complements the portion 32b of the scale-side lens 32 in the manner outlined above. This configuration nominally cancels aberrations such as coma and distortion which might otherwise be introduced by off axis imaging through the individual lenses 32 and 35 and large field angles. Stated another way, these aberrations caused by off-axis imaging through the second portion 32b of the scale-side lens 32, and large field angles, can be nominally canceled by the arrangement of the first portion 35a of the light receiving element-side lens 35 outlined above. This configuration can also compensate for lens imperfections (e.g., variations in surface shape) provided that the lens imperfections are identical for both lenses. Accordingly, for many practical and/or slightly imperfect lenses, the double off axis embodiment shown in FIGS. 11-13 is superior to the embodiment shown in FIG. 5.

As shown in FIG. 11, the optical axis La of the aperture 34 is located along the distance DL1L2 between the optical axes Ls, Lp of the two lenses 32, 35. Generally speaking, DL1L2=Dap1+Dap2. In one advantageous embodiment, the distance Dap1 and the distance Dap2 are nominally the same, such that the portions 32b and 35a may be approximately identical in shape.

Although the various design relationships outlined above have been described with reference to the double off axis configuration of the optical encoder 1G, it should be appreciated that more generally the foregoing teachings and design relationships may be adapted and applied to various other encoder embodiments disclosed herein, if desired (e.g., to other "off axis" and "double off axis" configurations disclosed herein).

Table 1 below shows one exemplary set of design dimensions which may be used in an exemplary embodiment of the optical encoder 1G. The dimensions are suitable, for example, when the scale track 2' has a Y-direction height of 1-2 mm. The scale track 2' may include either incremental scale markings 21 (e.g., a grating) or absolute scale markings 21. If spherical lenses are used, scale markings 21 having an X direction pitch (e.g., a grating pitch) as small as approximately 140 or 100 microns may be imaged with acceptable results. With properly designed aspheric lenses, scale markings 21 having an X direction pitch (e.g., a grating pitch) as small as approximately 20 microns (or larger) may be imaged with acceptable results, as described in greater detail below. The wavelength of the light emitted from the light source 31 may be on the order of 600-900 nm in some embodiments. The set of design dimensions may provide a compact readhead dimension along the Z direction on the order of 21 mm, and may provide a desirable gap tolerance on the order of approximately +/−200 microns.

TABLE 1

| Property | Value |
| --- | --- |
| FOVX (limited by receiving element 33) | 3.0 mm |
| FOVY (limited by (limited by receiving element 33) | 0.8 mm |
| Lens Diameter | Approx. 6.5 mm |
| Lens Thickness "T" | 4.0 mm |
| Lens to Aperture Distance | Approx. 3.5 mm |
| Aperture Dimension (X, Y) | (0.27 mm, 0.54 mm) |
| Dap1 | 0.875 mm |
| DL1L2 | 1.75 mm |
| Scale to Readhead Gap "G", Receiver Element to Lens Gap | Approx. 2.6 mm |
| Magnification | −1X |
| Focal length fs, fp | Approx. 4.5 mm |
| Back focal length | Approx. 3.2 mm |
| AP1, AP2 | Approx. 4.75 mm |

The values for "FOVX" and "FOVY" (the field of view on the scale track 2' along the X direction and Y direction, respectively, that are imaged onto the light receiving element 33) may be limited by the size of the light receiving element, rather than the scale track 2' or the other optical elements, in order to provide desirable assembly and alignment tolerances. For a compact readhead design, a relatively short focal length may be desirable. In one embodiment, for such short focal lengths, and a magnification in the range of 0.75 to 1.25, a relatively thick lens design may be desirable in order to provide undistorted imaging. For example, Table 1 shows that for a focal length of 4.5 mm, a lens thickness T of 4.0 mm has been found to provide acceptable performance. In some embodiments, a lens thickness T to focal length ratio in the range of 0.7 to 1.1 may provide acceptable performance.

While the "double off axis" design of the present invention described above is advantageous in reducing optical distortion and coma generated due to the "off axis" design and large field angles, other optical aberrations may remain. It has been found that when both the scale-side lens 32 and the light receiving element-side lens 35 have properly designed aspheric surfaces S1 (S1') and S2 (S2'), the remaining optical aberrations may be substantially eliminated, at least along the X reading direction. The aspheric surfaces S1 (and the similar surface S1') and S2 (and the similar surface S2') shown in FIGS. 11-12 approximately represent one exemplary set of surfaces. It has been found that in some exemplary embodiments desirable performance results, when the surface S1 is a first aspheric surface that is convex near the optical axis of the lens and has a slope along the radial direction that increases monotonically as a function of radius "r" from the optical axis of the lens, and the surface S2 is a second aspheric surface that is convex near the optical axis of the lens and has a slope along the radial direction that increases as a function of radius "r" over a first radius range RR1 (see FIG. 12) that includes the optical axis of the lens and decreases as a function of radius "r" over a second radius range RR2 that surrounds the first radius range RR1. When the scale-side lens 32 and the light receiving element-side lens 35 are configured such that the magnification M of the scale track image on the light receiving element 33 is greater than 0.75 and less than 1.25, it has been found that in some exemplary embodiments desirable performance results when the ratio of the radius R2 of the second aspheric surface S2 proximate to the optical axis of the lens and the radius R1 of the first aspheric surface S1 proximate to the optical axis of the lens, i.e., R2/R1, is greater than 1.1 and less than 1.7. Also, as previously outlined, in some exemplary embodiments desirable performance results when the ratio of the lens thickness "T" between the first aspheric surface S1 and the second aspheric surface S2 along the optical axis of the lens relative to a focal length F of the lens (fs, fp), i.e., T/F, is greater than 0.7 and less than 1.1. Various sets of aspheric surfaces that fall within a design range indicated by one or more of these guidelines for such embodiments may be determined by one skilled in the art based on analysis and or experiment.

It will be appreciated that these guidelines are exemplary only, and not limiting. For example, although excellent performance results when the first aspheric surface S1 of the scale-side lens 32 having the characteristics outlined above is arranged farther from the scale 2 and the second aspheric surface S2 of the scale-side lens 32 having the characteristics outlined above is arranged closer to the scale 2 (e.g., as shown in FIG. 12), and such a configuration may be preferred in some embodiments, it has been found that if the surface shapes of surfaces S1 and S2 are reversed (e.g., as would be observed by reversing the lenses 32 and 35 along the direction of their optical axes) reasonable performance may still be obtained in some applications.

The scale-side lens 32 and the light receiving element-side lens 35 may be formed of plastic, which is relatively inexpensive, light-weight, and easy to process (e.g., injection molding) but is relatively sensitive to environmental conditions such as temperature variation and moisture. Alternatively, the lenses may be formed of optical glass, which is less sensitive to environmental conditions.

Figure 14:
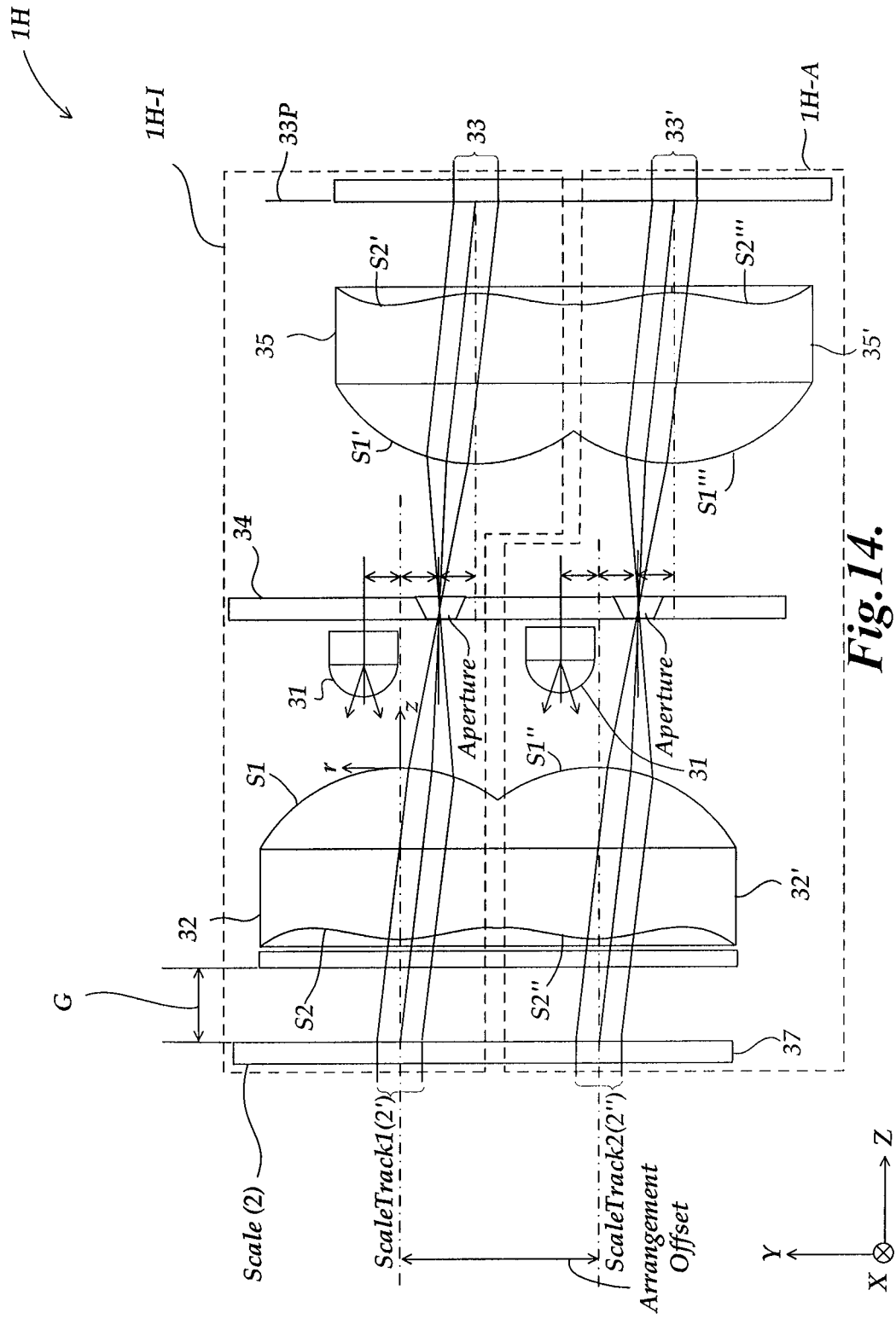
FIG. 14 is a schematic diagram illustrating the optical encoder of another embodiment of the present invention as seen along the X reading direction of a scale.

FIG. 14 illustrates a further embodiment 1H of an optical encoder incorporating aspects of the present invention, which includes a readhead having a first arrangement 1H-I for reading the scale track 2', and a second arrangement 1H-A for reading the scale track 2". In one embodiment, the first scale track 2' comprises incremental scale markings, which will be imaged onto an incremental light receiving element 33, and the second scale track 2" comprises absolute scale markings, which will be imaged onto an absolute light receiving element 33'. Stated another way, the readhead has two sets of a light source, a scale-side lens, an aperture, a light receiving element-side lens, and a light receiving element (e.g., one set providing incremental encoder signals for fine measurement resolution and the other set providing absolute encoder signals for absolute position determination over the measuring range of the encoder). The two sets may be configured in arrangements that are substantially the same (e.g., corresponding portions of their optical paths may approximately parallel to one another in the YZ plane) and may be arranged adjacent to each other along the direction perpendicular to the reading direction of the scale tracks. As illustrated, each of the arrangement 1H-I and the arrangement 1H-A is a double off axis configuration outlined above with reference to the optical encoder 1G shown in FIGS. 11-13. The first and second tracks 2' and 2" are offset from each other along the Y direction perpendicular to the X reading direction. The incremental light receiving element 33 and the absolute light receiving element 33' are likewise offset from each other along the Y direction. According to the present embodiment, a compact combination of the incremental encoder 1H-I and the absolute encoder 1H-A is achieved. In some applications of the two scale track embodiment shown in FIG. 8, it may be inconvenient or impractical to receive the light beams from two scale tracks using a single light receiving element. For example, in some cases changes in an operating gap relative to the scale track may cause optical cross-talk or conflicting image displacements between the light beams from the two scale tracks in that embodiment. In such applications, due to benefits associated with its parallel optical paths, the two scale track embodiment 1H of FIG. 14 may be more practical to build, and/or may operate more robustly with respect to gap variations.

The invention claimed is:

1. An optical encoder comprising a scale, which has a scale track extending along a reading direction and comprising scale markings, and a readhead, which includes a light source that emits light to the scale track and a light receiving element that is arranged to receive the light reflected by the scale track, so that a position of the readhead with respect to the scale is measured based on the light received by the light receiving element, wherein:
the readhead comprises a first lens that transmits the light emitted from the light source to the scale track and transmits the light reflected by the scale track as scale track image light to the light receiving element;
the light source is arranged on a light source plane located between a plane of the first lens and a plane of the light receiving element; and
a center of the light source is separated from an optical axis of the first lens by an illumination off-axis distance Dsrc in a direction perpendicular to the reading direction of the scale track.

2. The optical encoder of claim 1, further comprising an aperture that is located at an aperture plane between the plane of the first lens and the plane of the light receiving element, wherein a center of the aperture is separated from an optical axis of the first lens by an aperture off-axis distance Dap1 in a direction perpendicular to the reading direction and is configured to define a first lens off-axis imaging path of the scale track imaging light that reaches the light receiving element such that the aperture is arranged to receive the scale track image light through a portion of the first lens that includes the first lens off-axis imaging path, wherein the aperture and the light source are located on opposite sides of a plane including the optical axis of the first lens and the reading direction.

3. The optical encoder of claim 2, wherein 0.8*Dap1<Dsrc<1.2*Dap1.

4. The optical encoder of claim 3, wherein the aperture plane is located at a distance AP1, and the light source plane is located at a distance LSP, from the plane of the first lens along the direction of the optical axis of the first lens, and LSP<1.2*AP1.

5. The optical encoder of claim 4, wherein 0.7*AP1<LSP<AP1.

6. The optical encoder of claim 2, wherein the first lens has a first focal length defining a first focal plane which is located at a distance fs from the plane of the first lens along the direction of the optical axis of the first lens, the aperture plane is located at a distance AP1 from the plane of the first lens along the direction of the optical axis of the first lens, and 1.2*fs>AP1>0.8*fs.

7. The optical encoder of claim 6, wherein AP1>1.03*fs.

8. The optical encoder of claim 2, further comprising a second lens located at a second lens plane located between the aperture plane and the plane of the light receiving element, the second lens being arranged to receive the scale track image light transmitted through the aperture and to image the received scale track image light onto the light receiving element, wherein the second lens is similarly configured as the first lens and is oriented such that similarly shaped surfaces of the first and second lenses face in opposite directions along their respective optical axis direction, and the center of the aperture is separated from an optical axis of the second lens by an aperture off-axis distance Dap2 in a direction perpendicular to the reading direction and is configured to define a second lens off-axis imaging path of the scale track imaging light that reaches the light receiving element such that the aperture is arranged to transmit the scale track image light through a portion of the second lens that includes the second lens off-axis imaging path.

9. The optical encoder of claim 8, wherein the optical axis of the first lens and the optical axis of the second lens are separated by a distance DL1L2 along the direction perpendicular to the reading direction, and the center of the aperture is located along the distance DL1L2 between the optical axes of the first and second lenses.

10. The optical encoder of claim 9, wherein the distances Dap2 and Dap1 are nominally the same.

11. The optical encoder of claim 9, wherein 0.8*Dap1<Dsrc<1.2*Dap1.

12. The optical encoder of claim 9, wherein the first lens has a first focal length defining a first focal plane which is located at a distance fs from the plane of the first lens along the direction of its optical axis, the second lens has a second focal length defining a second focal plane which is located at a distance fp from the plane of the second lens along the direction of its optical axis, the aperture plane is located at a distance AP1 from the plane of the first lens along the direction of its optical axis and a distance AP2 from the plane of the second lens along the direction of its optical axis, and 1.2*fs>AP1>0.8*fs.

13. The optical encoder of claim 12, wherein the aperture plane is located farther from the plane of the first lens than the first focal plane.

14. The optical encoder of claim 12, wherein the aperture plane is located between the first and second focal planes.

15. The optical encoder of claim 12, wherein 1.2*fp>AP2>0.8*fp.

16. The optical encoder of claim 12, wherein the light source plane is located at a distance LSP from the plane of the first lens along the direction of the optical axis of the first lens, and LSP<1.2*AP1.

17. The optical encoder of claim 16, wherein 0.7*AP1<LSP<AP1.

18. The optical encoder of claim 12, wherein AP1>1.03*fs.

19. The optical encoder of claim 9, wherein the first lens and the second lens each comprise an aspheric lens wherein a first aspheric surface of the first lens and the second lens is a curve that is convex near the optical axis of its lens and has a slope along the radial direction that increases monotonically as a function of radius from the optical axis of its lens, and a second aspheric surface of the first lens and the second lens is a curve that is convex near the optical axis of its lens and has a slope along the radial direction that increases as a function of radius over a first radius range including the optical axis of its lens and decreases as a function of radius over a second radius range that surrounds the first radius range.

20. The optical encoder of claim 19, wherein the first aspheric surface of the first lens is arranged farther from the scale track and the second aspheric surface of the first lens is arranged closer to the scale track.

21. The optical encoder of claim 19, wherein the first and second lens are configured such that the magnification M of the scale track image on the light receiving element is 0.75<M<1.25, a ratio of the radius R2 of the second aspheric surface proximate to its optical axis and the radius R1 of the first aspheric surface proximate to that optical axis is 1.1<[R2/R1]<1.7, and a ratio of a lens thickness T between the first and second aspheric surfaces along their optical axis relative to a focal length F of their lens is 0.7<[T/F]<1.1.

22. The optical encoder of claim 9, wherein the scale further includes a second scale track, which extends along the reading direction, comprises scale markings and is offset from the first scale track along a direction perpendicular to the reading direction, and the readhead comprises:
    a first arrangement of the light source, the first lens, the aperture, the second lens, and the light receiving element according to claim 9, and
    a second arrangement configured to operate similarly to the first arrangement, the second arrangement comprising a second light source, a third lens similar to the first lens, a second aperture, and a fourth lens similar to the second lens, and a second light receiving element, wherein the second arrangement is offset from the first arrangement along the direction perpendicular to the reading direction such that it images the second scale track onto the second light receiving element.

23. The optical encoder of claim 1, further comprising a light absorber positioned to receive light reflected from a portion of the light receiving element where the scale track image is formed and configured to absorb the received light reflected from the portion of the light receiving element.

* * * * *